United States Patent
Jahanshahi et al.

(10) Patent No.: US 10,753,881 B2
(45) Date of Patent: Aug. 25, 2020

(54) METHODS AND SYSTEMS FOR CRACK DETECTION

(71) Applicant: Purdue Research Foundation, West Lafayette, IN (US)

(72) Inventors: Mohammad Reza Jahanshahi, West Lafayette, IN (US); Fu-Chen Chen, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 248 days.

(21) Appl. No.: 15/606,921

(22) Filed: May 26, 2017

(65) Prior Publication Data

US 2017/0343481 A1   Nov. 30, 2017

Related U.S. Application Data

(60) Provisional application No. 62/342,573, filed on May 27, 2016.

(51) Int. Cl.
  *G01B 5/28* (2006.01)
  *G01N 21/88* (2006.01)
  *G06K 9/00* (2006.01)
  *G06N 20/00* (2019.01)
  *G06K 9/46* (2006.01)
  (Continued)

(52) U.S. Cl.
  CPC ..... *G01N 21/8803* (2013.01); *G06K 9/00744* (2013.01); *G06K 9/00791* (2013.01); *G06K 9/4628* (2013.01); *G06N 3/0454* (2013.01); *G06N 7/005* (2013.01); *G06N 20/00* (2019.01); *G06T 7/0004* (2013.01); *G06T 7/33* (2017.01); *G06T 7/44* (2017.01); *G01N 2021/8887* (2013.01); *G06K 9/6278* (2013.01); *G06K 2009/3291* (2013.01); *G06K 2009/4666* (2013.01); *G06T 2207/10016* (2013.01); *G06T 2207/20081* (2013.01); *G06T 2207/20084* (2013.01); *G06T 2207/30132* (2013.01)

(58) Field of Classification Search
None
See application file for complete search history.

(56) References Cited

U.S. PATENT DOCUMENTS

2013/0034305 A1* 2/2013 Jahanshahi ........ G06K 9/00624
                                                                    382/201
2013/0155061 A1* 6/2013 Jahanshahi ............. G06T 15/00
                                                                    345/419

(Continued)

*Primary Examiner* — Aditya S Bhat
(74) *Attorney, Agent, or Firm* — Hartman Global IP Law; Gary M. Hartman; Domenica N. S. Hartman

(57) ABSTRACT

Systems and methods suitable for capable of autonomous crack detection in surfaces by analyzing video of the surface. The systems and methods include the capability to produce a video of the surfaces, the capability to analyze individual frames of the video to obtain surface texture feature data for areas of the surfaces depicted in each of the individual frames, the capability to analyze the surface texture feature data to detect surface texture features in the areas of the surfaces depicted in each of the individual frames, the capability of tracking the motion of the detected surface texture features in the individual frames to produce tracking data, and the capability of using the tracking data to filter non-crack surface texture features from the detected surface texture features in the individual frames.

20 Claims, 34 Drawing Sheets

(51) Int. Cl.
    *G06N 3/04*       (2006.01)
    *G06N 7/00*       (2006.01)
    *G06T 7/00*        (2017.01)
    *G06T 7/33*        (2017.01)
    *G06T 7/44*        (2017.01)
    G06K 9/62       (2006.01)
    G06K 9/32       (2006.01)

(56) References Cited

U.S. PATENT DOCUMENTS

2016/0016312 A1*   1/2016   Lawrence, III .... G01N 21/9515
                                                                   700/98
2018/0279943 A1*  10/2018   Budman ............... G06F 19/321

* cited by examiner (a) Sample crack patches with false-positives.

(b) Sample crack patches after discarding non-crack tubelets.

(c) Sample bounding boxes of crack clusters (red). The blue dashed boxes are the ground truths.

(a) Ground truth and detected crack boxes without Bayesian data fusion.
(b) Ground truth and detected crack boxes with Bayesian data fusion.

METHODS AND SYSTEMS FOR CRACK DETECTION

CROSS REFERENCE TO RELATED APPLICATIONS

This application claims the benefit of U.S. Provisional Application No. 62/342,573, filed May 27, 2016, the contents of which are incorporated herein by reference.

BACKGROUND OF THE INVENTION

The present invention generally relates to remote inspection techniques. The invention particularly relates to automated remote inspection for detection of cracks in a surface.

It is generally accepted that in the absence of adequate periodic inspection and follow-up maintenance, civil infrastructure systems, including nuclear power plant components, inevitably deteriorate, in large part due to excessive long-term usage, overloading, and aging materials. In particular, regular inspection of nuclear power plant components, for example, for cracks, is an important task to improve their resiliency. Nuclear power plant reactors are typically submerged in water. Consequently, direct manual inspection of reactors is unfeasible due to high temperatures and radiation hazards. An alternative solution is to use a robotic arm to remotely record videos at the underwater reactor surface.

However, inspections that rely on remote visual techniques, wherein an inspector reviews optical images or video of the components, can be both time-consuming and subjective. Recent blind testing of remote visual examination personnel and techniques has identified a need for increased reliability associated with identifying cracks from review of live and recorded data. Results indicate that reliable crack identification can be degraded by human performance even when identification should be evident. The quantity and complexity of reviewing large quantities of data increase the likelihood of human error.

The utilization of automated crack detection algorithms can improve the speed of the exams and reduce the potential for human error. Most existing automatic crack detection algorithms are based on edge detection, thresholding, or morphological operations. However, these types of automated crack detection algorithms may fail to detect cracks on metallic surfaces since these cracks are typically very small and have low contrast. In addition, the existence of various "non-crack" surface texture features, for example, surface scratches, welds, and grind marks, may lead to a large number of false positives, that is, mistakenly attributing a non-crack surface texture feature to be a crack on a surface, especially if the non-crack surface texture features have relatively linear shapes and stronger contrast than the cracks.

In view of the above, it can be appreciated that there is an ongoing desire for improved inspection methods and systems capable of reliably detecting surface cracks, for example, during inspections of nuclear power plant components.

BRIEF DESCRIPTION OF THE INVENTION

The present invention provides systems and methods capable of autonomous crack detection in surfaces by analyzing video of the surfaces.

According to one aspect of the invention, a system for detecting cracks in a surface includes a video camera, a light source, the capability to simultaneously scanning the video camera and the light source past the surface while filming with the camera to produce a video of the surface, a visual descriptor configured to analyze individual frames of the video to obtain surface texture feature data for areas of the surface depicted in each of the individual frames, a trained machine learning classifier configured to analyze the surface texture feature data to detect surface texture features in the areas of the surface depicted in each of the individual frames, the capability of tracking the motion of the detected surface texture features in the individual frames to produce tracking data, and the capability of using the tracking data to filter non-crack surface texture features from the detected surface texture features in the individual frames.

According to another aspect of the invention, a system for detecting cracks in a surface includes a video camera, a light source, the capability to simultaneously scanning the video camera and the light source past the surface while filming with the camera to produce a video of the surface, a convolutional neural network (CNN) architecture configured to analyze individual frames of the video to obtain surface texture feature data for areas of the surface depicted in each of the individual frames and analyze the surface texture feature data to detect surface texture features in the areas of the surface depicted in each of the individual frames, the capability of tracking the motion of the detected surface texture features in the individual frames to produce tracking data, and the capability of using the tracking data to filter non-crack surface texture features from the detected surface texture features in the individual frames.

According to another aspect of the invention, a method for detecting cracks in a surface includes simultaneously scanning a video camera and a light source past the surface while filming with the camera to produce a video of the surface, analyzing individual frames of the video to obtain surface texture feature data for areas of the surface depicted in each of the individual frames, analyzing the surface texture feature data to detect surface texture features in the areas of the surface depicted in each of the individual frames, tracking the motion of the detected surface texture features in the individual frames to produce tracking data, and using the tracking data to filter non-crack surface texture features from the detected surface texture features in the individual frames.

Technical effects of the systems and method described above preferably include the ability to autonomously analyze video to detect cracks in a surface. A particular but nonlimiting example is the ability to detect cracks during inspections of underwater nuclear power plant components that may have scratches, welds, grind marks, etc., which can generate false positives.

Other aspects and advantages of this invention will be further appreciated from the following detailed description.

DETAILED DESCRIPTION OF THE INVENTION

The present invention generally provides systems and methods for automated remote inspection techniques that are capable of detecting one or more cracks in a surface. In particular, the systems and methods use a computer program that accurately detect cracks in individual video frames of remote inspection videos, including videos obtained with video cameras of types that have been commonly used in industry for visual inspection. For example, the program may describe surface texture features on/at a surface and then apply a trained machine learning classifier, including but not limited to support vector machines (SVM), naive Bayes, logistic regression, decision trees, neural network, and deep learning, to detect cracks based on the described surface texture features. It should be understood that the systems and methods described herein can be used to detect surface texture features other than cracks.

In a first nonlimiting embodiment, systems and methods implement local binary patterns (LBP) to accurately detect cracks in individual video frames of remote inspection videos. LBP is used to describe surface texture features on/at a surface and then applies a trained machine learning classifier, for example support vector machines (SVM). Although this embodiment will be described hereinafter in reference to an SVM, it will be understood that various other trained machine learning classifiers may be suitable for the use with the present embodiment. LBP is a widely used image feature (visual) descriptor for surface texture classification and object recognition, and SVM is a machine learning technique that can be trained as a classifier to predict an appropriate label of input data. Crack detection systems and methods that utilize these two techniques in combination may be referred to herein as LBP/SVM-based systems and/or methods. In the present embodiment, an SVM can be trained as a classifier to predict an appropriate "crack" or "non-crack" label for detected surface texture features. Detected surface texture features that are determined to be "non-cracks" (that is, false positives) may then be filtered out of the results by applying a suitable algorithm, such as a Bayesian decision theory-based algorithm. In particular, the program may track detected surface texture features in a sequence (e.g., consecutive) of individual video frames and identify false positives when cracks are not detected in the consecutive frames as expected. This method is referred to herein as Bayesian data fusion in view of the information obtained from the multiple frames being "fused" together and considers the spatial and temporal coherence of cracks in frames of videos to filter out false positives and thereby increase the reliability and robustness of crack detection.

Figure 1:
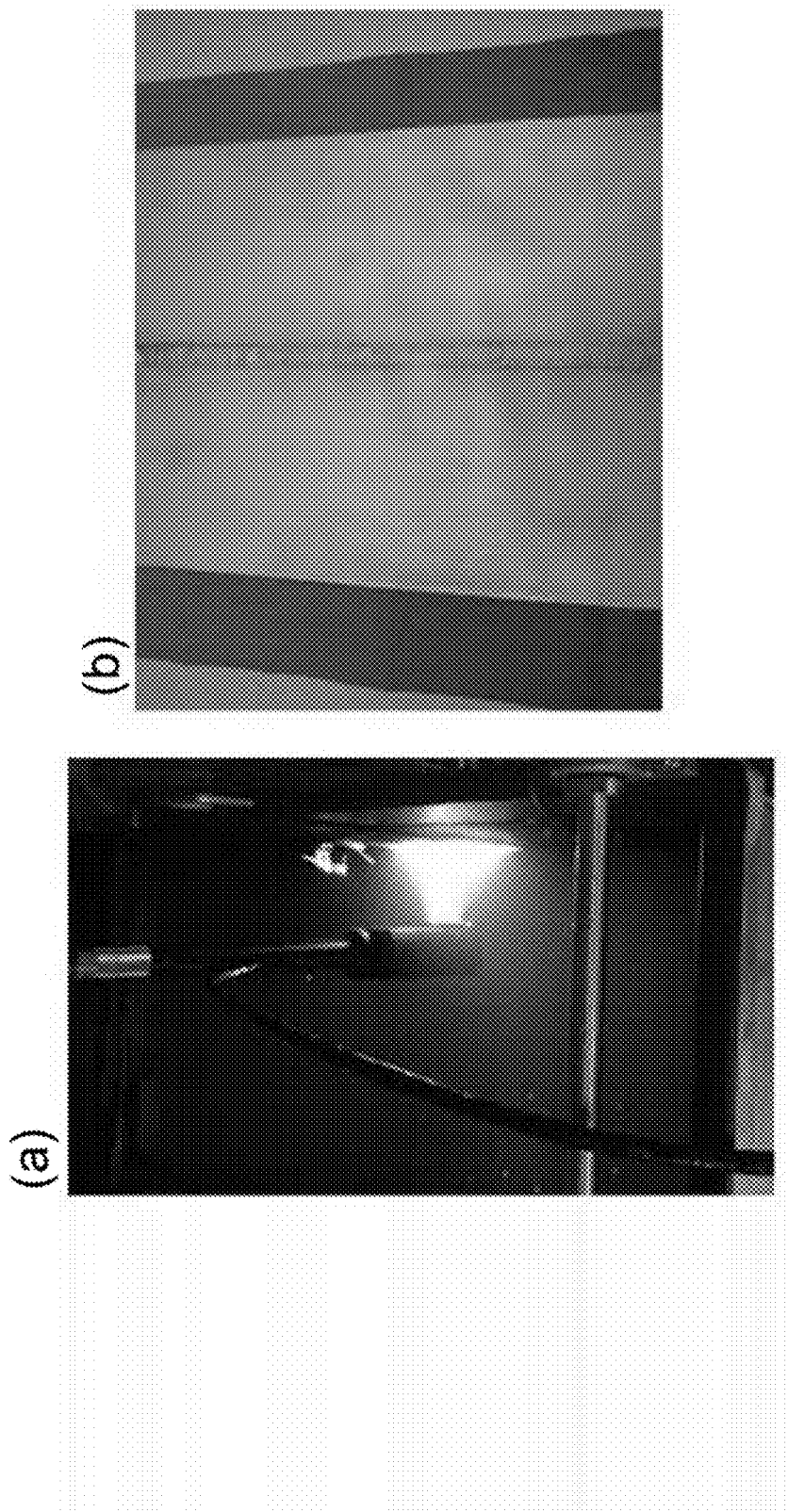
FIG. 1 includes scanned images of a camera and a light source (image "a") capable of scanning and filming surfaces of a component, and a sample component having a welded surface (image "b").
Figure 2:
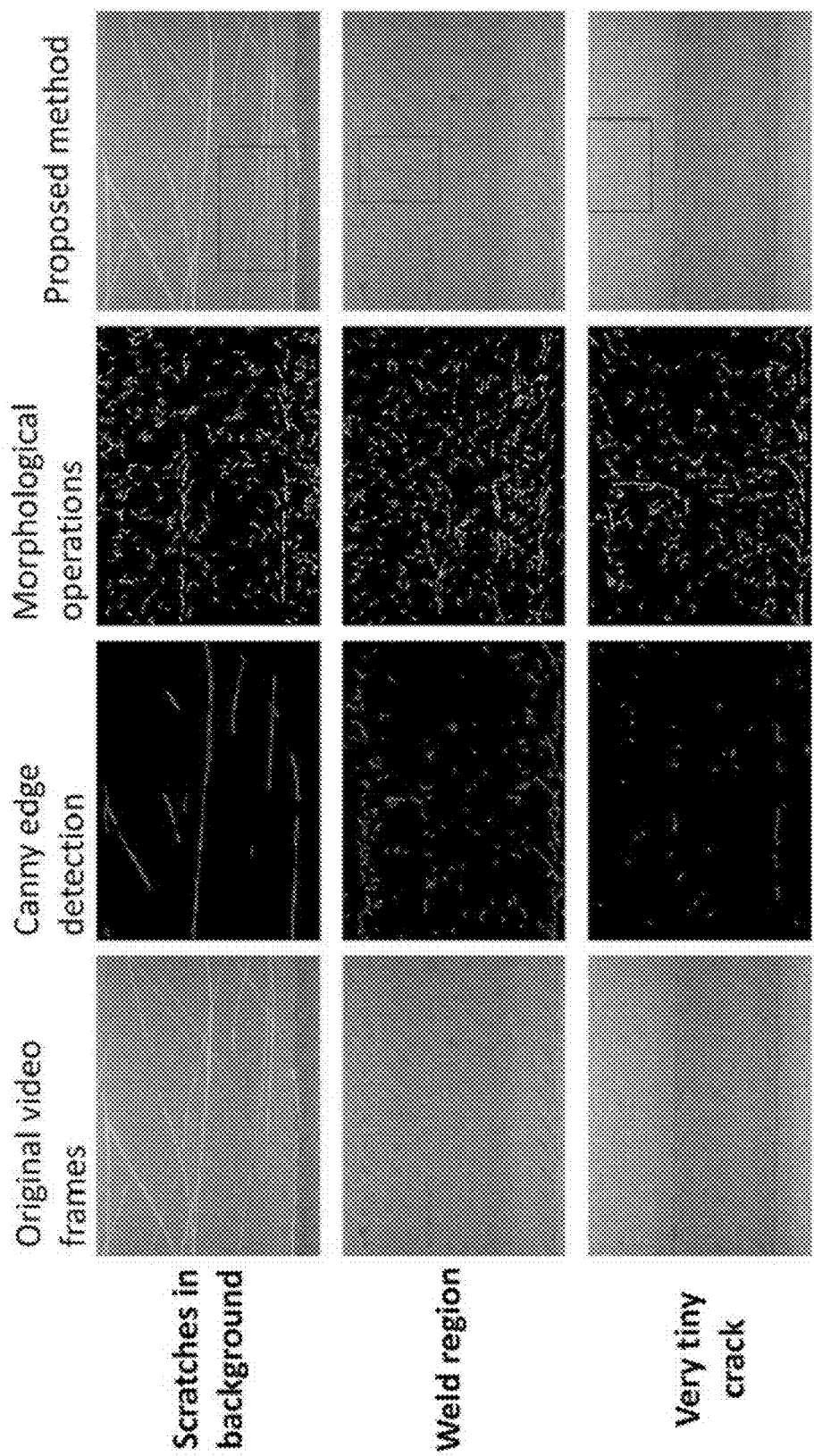
FIG. 2 contains images of video frames of a surface that show samples of crack detection results generated by a local binary patterns/support vector machines (LBP/SVM) based system in comparison with two state-of-the-art algorithms, that is, canny edge detection and morphological operations.

FIG. 1 represents a video camera and a light source (image "a") capable of producing a video of a surface (e.g., image "b") by simultaneously scanning both the camera and the light source along the surface while filming with the camera. FIG. 2 contains images of video frames of a surface that show samples of crack detection results generated by the LBP/SVM-based system in comparison with two state-of-the-art algorithms, that is, canny edge detection and morphological operations with optimized thresholds. In this figure, the scratches, welds, and contrasts of a very tiny crack affected the performance of the other two conventional methods, whereas the LBP/SVM-based system correctly detected cracks.

Figure 3:
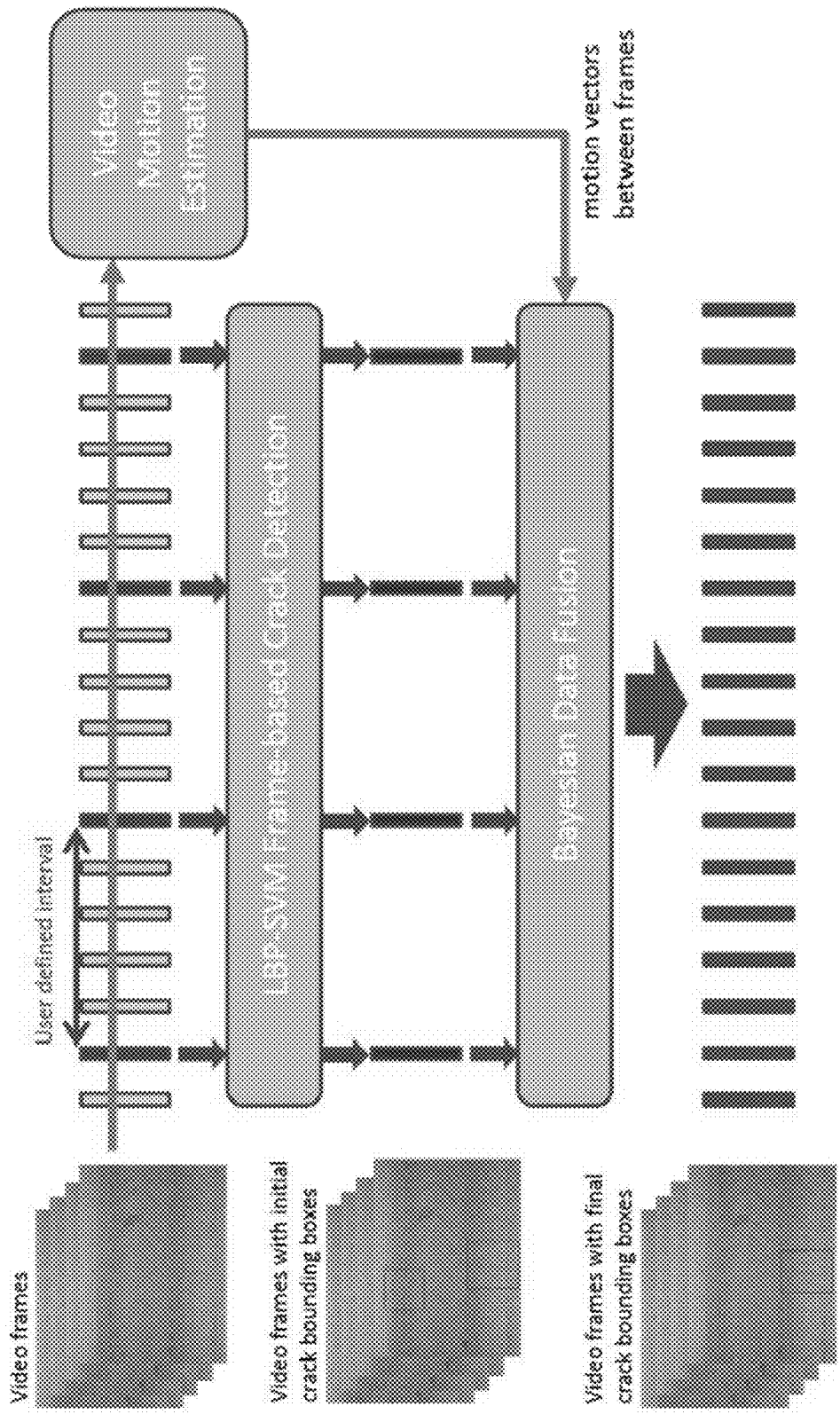
FIG. 3 schematically represents certain steps of a LBP/SVM-based crack detection method in accordance with a first nonlimiting embodiment of the invention.

FIG. 3 schematically represents certain steps for a nonlimiting embodiment of a LBP/SVM-based system/method capable of detecting cracks in a surface. Initially, the system analyzes individual video frames to detect various surface texture features using LBP and SVM. For example, in the "Video Motion Estimation" step, the motion vector between successive frame pairs of all video frames may be estimated to provide information on the movement of detected cracks and track them in different frames. It is unnecessary to detect a surface texture feature in every single frame of a video if there are overlapped regions between successive frames. Therefore, the system preferably selectively analyzes individual frames once every predefined number of frames (labeled as "user defined interval") in order to reduce the time necessary for crack detection (e.g., one frame per second). In order to track detected surface texture features in different frames to remove false positives (for example, non-cracks such as scratches, welds, grind marks, etc.), motion vectors between every successive frame pair (that is, two consecutive analyzed frames) may be detected for all the frames in order to determine the movement of detected surface texture features and to track them through the video.

The LBP/SVM-based system/method may then apply a Bayesian decision theory-based algorithm to determine whether tracked surface texture features are actually cracks or merely false positives (non-cracks). The Bayesian decision theory is particularly suitable for such decision-making as it provides a theoretical method to model the probability of frames containing a crack and non-cracks rather than naively setting arbitrary thresholds or parameters. Optionally, the system may provide "confidence level" information indicating a probability of a crack being within a frame.

Figure 4:
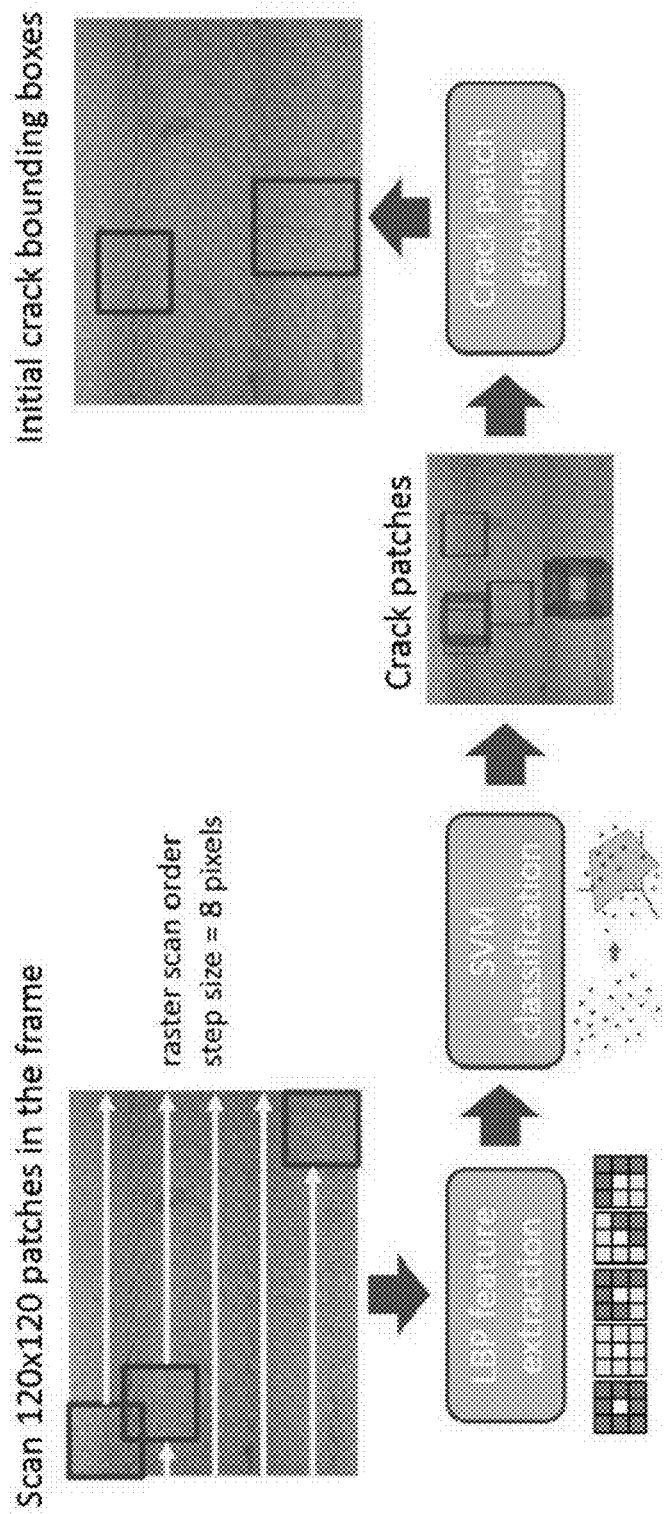
FIG. 4 schematically represents certain steps for detecting cracks in an individual video frame in accordance with a nonlimiting aspect of the invention.
Figure 5:
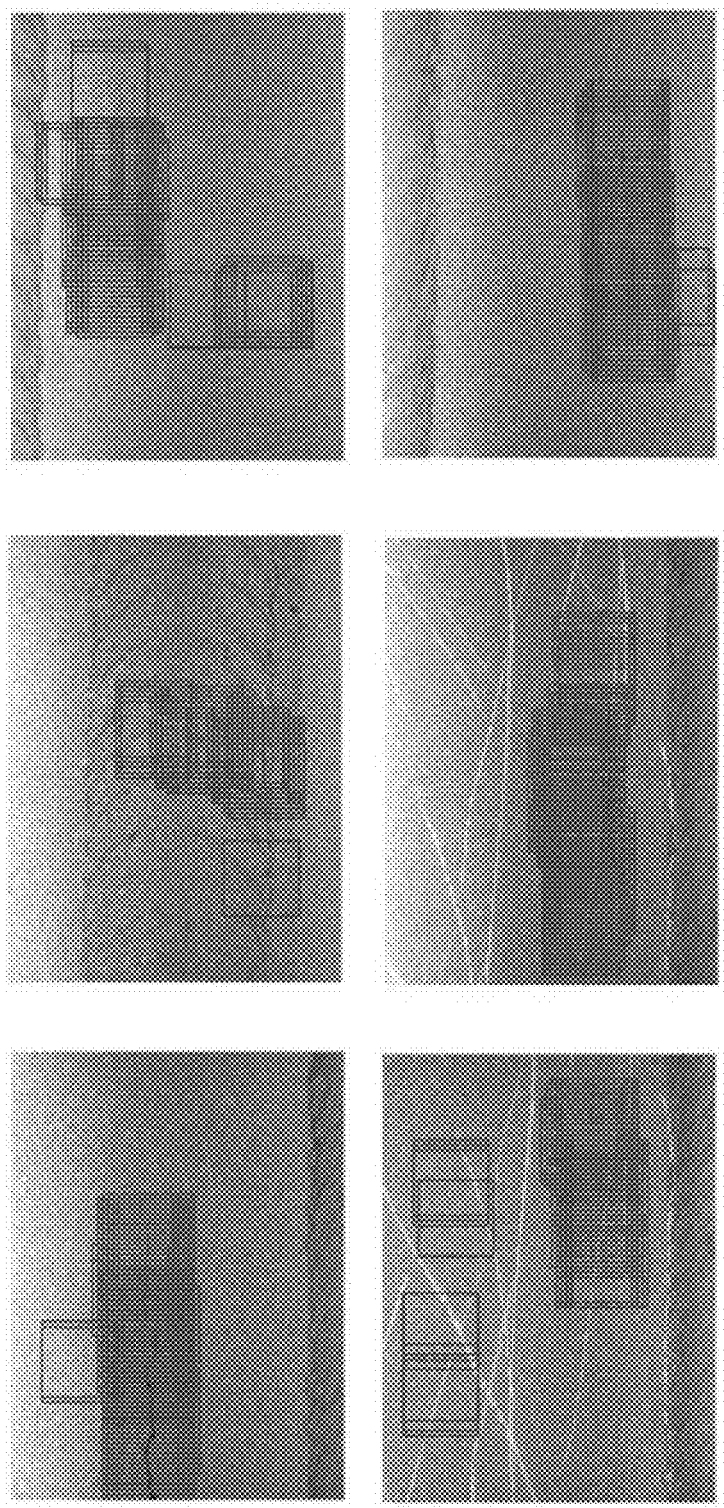
FIG. 5 represents nonlimiting examples of video frames, each displaying scan patches in which cracks were detected.

FIG. 4 represents steps of a LBP/SVM-based method performed with an individual video frame. First, the whole frame is scanned with fixed-sized "scan windows" or "scan patches" (or simply "windows" or "patches") in raster scan order (line-by-line scanning) where adjacent scan patches have a fixed overlapped area. In the represented nonlimiting example, the patch size was 120×120 pixels and the step size of the raster scan was 8 pixels. The LBP surface texture features of every scanned patch are extracted and the SVM classifier is applied to determine whether a crack is present within the patch. FIG. 4 identifies the patches determined by the SVM classifier to contain a crack as "crack patches," whereas patches that do not contain a crack are identified as "non-crack patches." FIG. 5 shows various exemplary frames having patches that were determined by the SVM classifier to contain a crack.

For the purpose of performing crack detection, it is desired to distinguish cracks from other surface texture features, including but not limited to scratches, welds, and grind marks. LBP is an illuminant-invariant image feature descriptor for surface texture classification and object recognition. The illuminant-invariant property of LBP is beneficial for crack detection since light conditions may vary and some cracks may be very small with low contrast.

For any given pixel, p, LBP may compare its intensity value to all neighboring pixels $q_k \in p_{nei}$ to generate a binary code $b1b2 \ldots b_{|p\_nei|}$ and convert the binary code to a decimal LBP value $LBP(p)$ as follows:

$$LBP(p) = \sum_{k=1}^{|p_{nei}|} b_k 2^{k-1}$$

wherein $b_k=1$ if $q_k \geq p$; otherwise, $b_k=0$.

Figure 6:
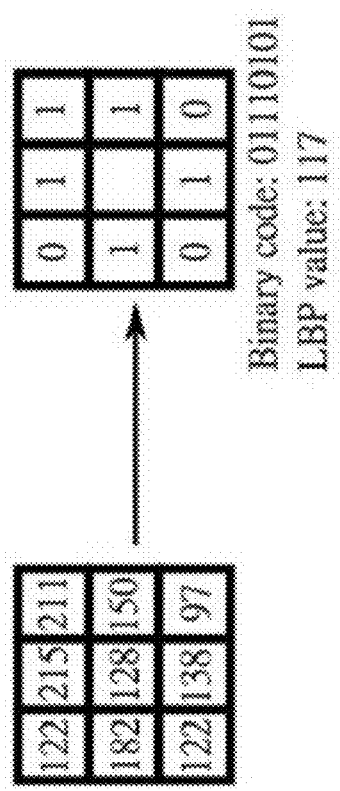
FIGS. 6 and 7 schematically represent a method of generating surface texture feature data for an image within a scan patch.
Figure 7:
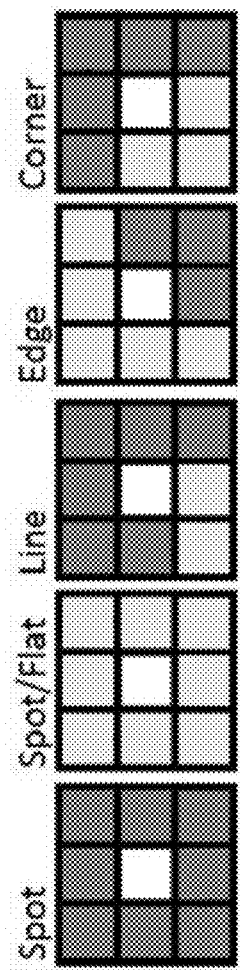

FIG. 6 represents a nonlimiting example of generating the LBP value where $p_{nei}$ is 8-neighbor of p, starting at the left-top corner with a clockwise order. As an example, after comparing p with all $q_k$s, the binary code $b1b2 \ldots b_{|p\_nei|}$ becomes 01110101 and the corresponding decimal LBP value is 117. Different LBP values represent different surface texture features around the pixel of interest. FIG. 7 represents various typical and different surface texture features with their corresponding patterns where the bright pixels correspond to $b_k=1$ and the dark pixels correspond to $b_k=0$. To generate the LBP feature vector of a patch, all of the LBP values of pixels in the patch may be calculated. Then, for every predefined region inside the patch, a histogram of LBP values inside the region may be computed. The histogram represents the concurrence of different surface texture features in that region. The LBP feature vector may be formed by cascading the histogram of each region. Neighboring pixels and regions are defined using free parameters and may lead to varying performances and complexities.

Figure 8:
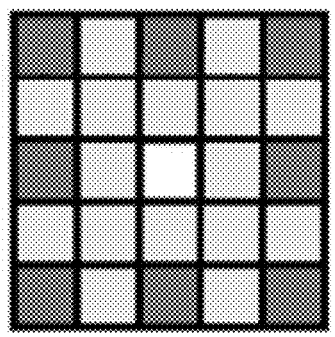
FIG. 8 represents a multi-scale 8-neighbor LBP 5×5 pixel box.

For the purposes of crack detection, multi-scale LBP is believed to be preferred over single-scale LBP as it is considered to provide improved performance. Multi-scale LBP is performed by changing the distances of neighboring pixels, calculating their histograms separately, and concatenating all the histograms together. Different distances of neighboring pixels can capture the surface texture feature in different scales. For example, one can define the neighboring pixels as eight points uniformly distributed on a circle, calculate histograms when the radius of the circle is 1, 2, and 3, then concatenate these three histograms as a LBP feature vector. FIG. 8 represents a multi-scale 8-neighbor LBP 5×5 pixel box.

Figure 9:
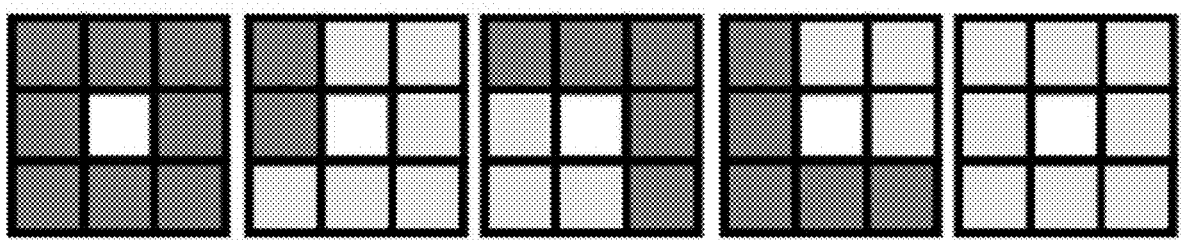
FIG. 9 represents various nonlimiting uniform and non-uniform LBP patterns.
Figure 9:
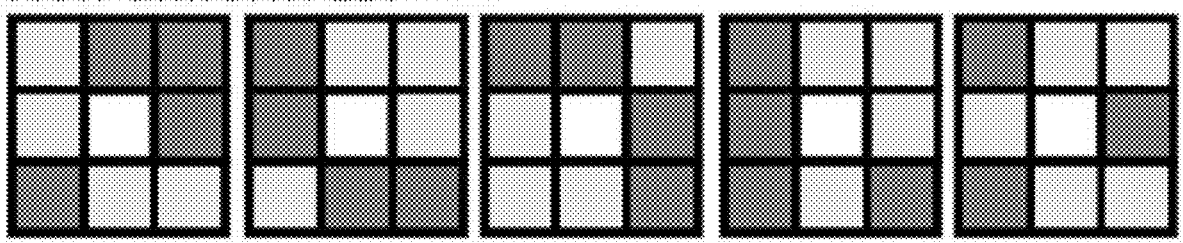

Not all LBP values represent meaningful surface texture features. Rather, some LBP values may merely represent noise. Therefore, the system preferably uses a type of LBP called "uniform LBP" that keeps only the meaningful patterns of surface texture features, which not only reduces the feature dimension but also has better performance. Uniform LBP only allows at most two '1 to 0' or '0 to 1' bit transitions in a binary code, including the transition between Least Significant Bit (LSB) and Most Significant Bit (MSB). For example, 00000000, 00111100, and 11000011 are valid binary codes of uniform LBP, but 11001011 and 10001000 are not. In other words, the uniform LBP only allows one continuous sequence of '0s' and '1s' to appear in a binary code, that can represent obvious corner or edge patterns. FIG. 9 represents various nonlimiting uniform and non-uniform LBP patterns. When computing the histogram of uniform LBP, the system accumulates the valid LBP values in separate bins and keeps the invalid LBP values in an additional bin. For example, an 8-neighbor uniform LBP has fifty-eight valid binary codes. Consequently, it accumulates these valid LBP values into fifty-eight separate bins and leaves the other invalid values in another bin. For example, a 4-scale 8-neighbor uniform LBP may be used where the neighboring pixels are the corners and the mid-points of edges of 3×3, 5×5, 7×7, and 9×9 pixel boxes. The system computes six histograms of regions inside the 120×120 patch including three rectangular regions that equally divide the patch in horizontal directions, and three regions in vertical directions, as represented in the left-hand image of FIG. 25 ("6 regions"). Thus, the resulting surface texture feature dimension is 59×4×6=1416.

As previously noted, in order to detect cracks in a frame, the whole frame is preferably scanned with overlapping patches in a raster scan order. It would be computationally costly to compute LBP surface texture features of all the patches separately. Since the scanning patches overlap and the LBP surface texture feature is actually the histogram of LBP values of specific rectangular regions, the concept of integral histogram can be used to quickly compute all the required histograms. Subsequently, a histogram of a specific region may be computed using a relatively simple calculation.

Figure 10:
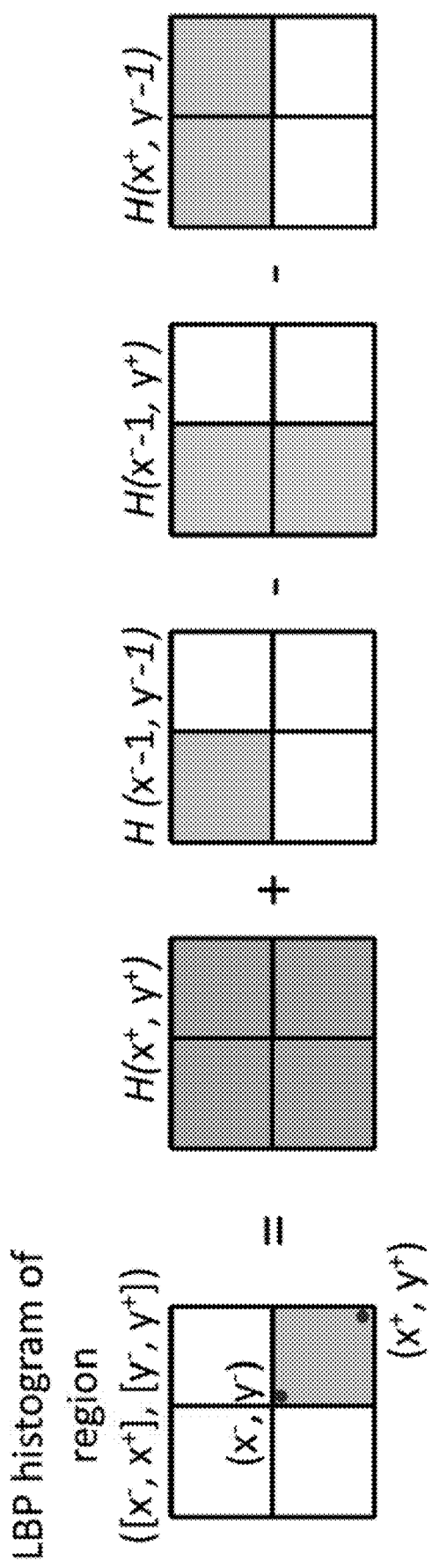
FIG. 10 schematically represents a method of computation of a histogram of rectangular region ($[x^-, x^+],[y^-, y^+]$) in accordance with a nonlimiting aspect of the invention.

In order to detect cracks in a frame, the entire frame is scanned with overlapping patches in raster scan order. Computing the LBP features of all patches separately is very inefficient. Thus, an integral histogram may be used to compute the LBP histogram efficiently. For example, the integral histogram $H(x, y)$ is the histogram of all the pixels in the rectangular region ([0, x], [0, y]), and could be written as:

$$H(x,y)=H(x-1,y)+H(x,y-1)-H(x-1,y-1)+Q(x,y)$$

where $Q(\bullet)$ is the corresponding bin of the current pixel, and the addition and subtraction signs represent the sum and the subtract of the value of the same bins, respectively. All the integral histograms could be obtained in raster scan order using the equation above. Then for any arbitrary rectangular region ($[x^-, x^+],[y^-, y^+]$), its histogram could be computed in constant time as $H(x^+, y^+)+H(x^--1, y^--1)-H(x^+, y^--1)-H(x^--1, y^+)$ as represented in FIG. 10. A similar integral histogram process is described in Porikli, F., "Integral histogram: a fast way to extract histograms in Cartesian spaces," IEEE Computer Society Conference on Computer Vision and Pattern Recognition CVPR 2005, Volume 1, pp. 829-836 vol. 1, incorporated herein by reference.

Figure 11:
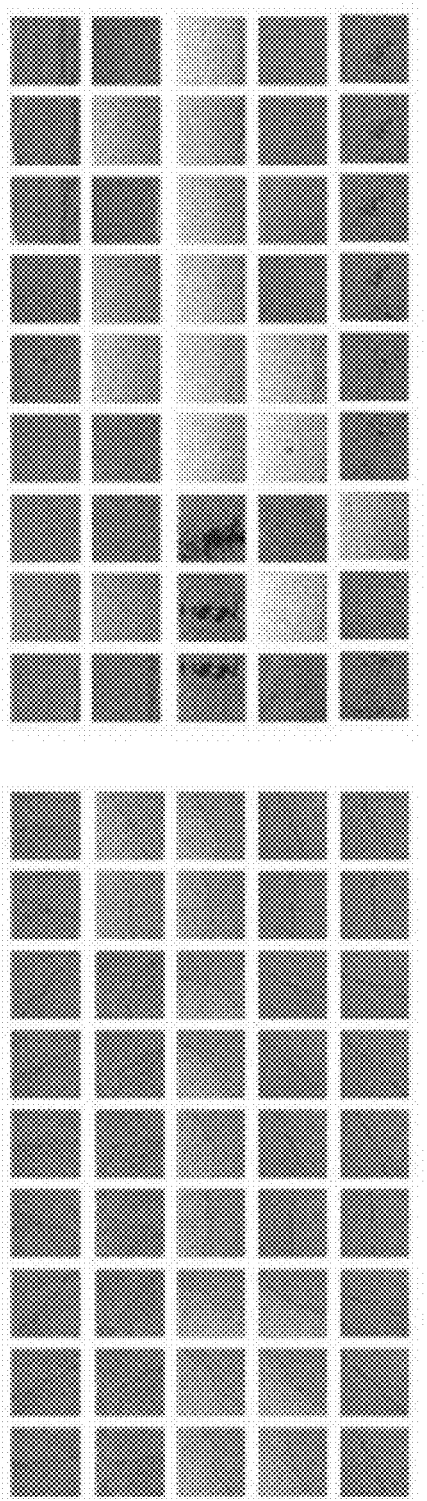
FIG. 11 represents various images of surfaces that have cracks (image "a") and do not have cracks (image "b") and are suitable for training a support vector machine (SVM) of a type suitable for use in a crack detection method in accordance with a nonlimiting aspect of the invention.

After determining that an LBP surface texture feature is present in a patch, a trained SVM classifier may be applied to determine whether the surface texture feature is a crack. In investigations leading to the present invention, a classifier was trained by manually cropping 4153 non-crack images (images that did not contain a crack) and 611 crack images (images that did contain a crack) each having a size of 120×120 pixels. Some of the crack images were also rotated by 22.5, 45, and 67.5 degrees to train the SVM classifier to detect cracks in different orientations. FIG. 11 includes various nonlimiting examples of images that were used for training. Images on the left-hand side of FIG. 11 contain cracks (images "a"), and images on the right-hand side of FIG. 11 do not contain cracks (images "b"). The total number of crack images including both the original crack images and the rotated crack images was 2272.

SVM classifiers have various types of kernels. In general, linear kernel is very fast but relatively inaccurate, while Radial Basis Function (RBF) kernel is very accurate but requires more computation time for classification. Assuming that most of the patches do not contain cracks in the video (generally more than 95% in practice), a two-stage (or multi-stage) SVM classification scheme that is similar to cascade object detection is preferably used to speed-up the process. As a nonlimiting example, a linear SVM may be trained with specific parameters that would have 100% detection rate (recall rate) but 25% false positive rate during a cross-validation process of training. In other words, this linear SVM retains 100% of patches containing cracks, retains 25% of patches that do not contain cracks, and filters out the remaining 75% of patches that do not contain cracks. For each patch, the linear SVM classifier may be applied in a first stage. If a patch is classified as containing a crack by the linear SVM, an RBF SVM with normal parameters that has higher accuracy than the linear SVM may be applied in a second stage to remove the remaining 25% of patches that do not contain cracks. Preferably, only patches that are regarded as containing a crack by both the linear and the RBF SVMs are considered as actually containing a crack. By doing this, the system excludes 75% of patches that do not contain cracks in the first stage with a linear SVM that is much faster than RBF SVM, thus significantly reducing computation time of the system relative to a system that uses only the RBF SVM.

Figure 12:
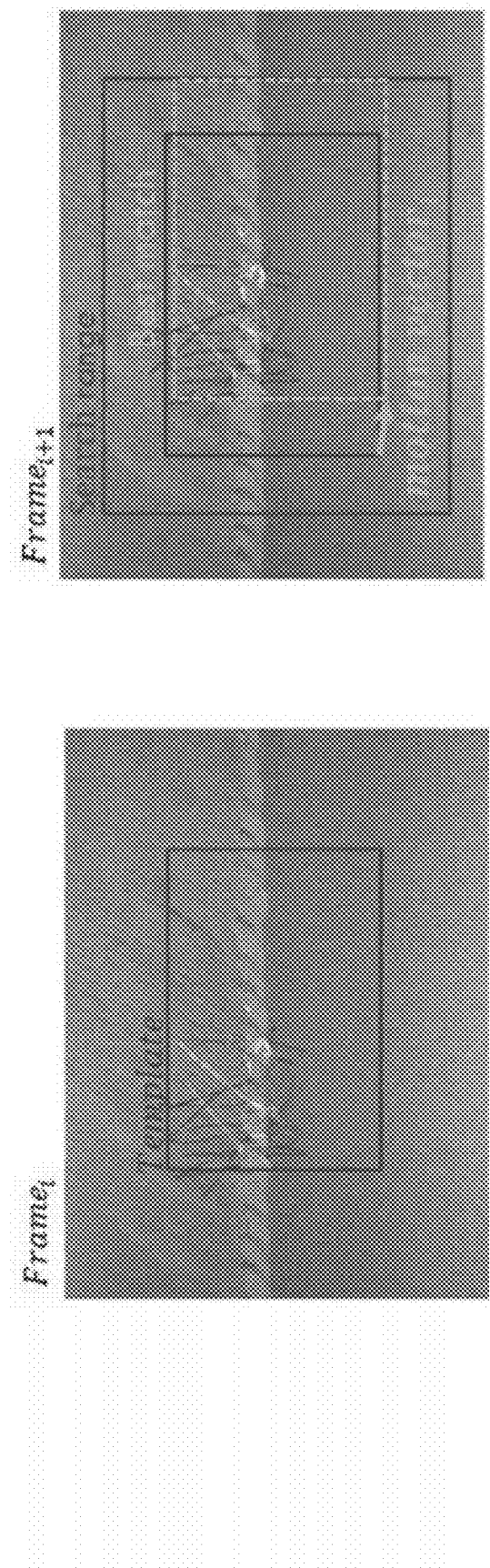
FIG. 12 represents an example of a motion estimation procedure in accordance with a nonlimiting aspect of the invention.

In order to estimate the movement of cracks and track them in different frames, the LBP/SVM-based system may estimate motion vectors between successive frame pairs. For example, $MV_i$ refers to an estimated motion vector between $frame_i$ and $frame_{i+1}$. The movement from $frame_k$ to $frame_{k+n}$ is the summation of all motion vectors between the frames: $MV_k+MV_{k+1}+ \ldots +MV_{k+-1}$. Since most of the movements in the videos are translation without much zooming in or out, the translation model may be assumed and a block-based motion estimation may be used to calculate the movement between frame pairs. According to this method, in $frame_i$, an inner block region may be selected as a template and in $frame_{i+1}$, a search is performed for the best match of the template in an outer block region called search range. Then, the motion vector will be the displacement of the position of the template in $frame_i$ and the best match in $frame_{i+1}$. The matching criteria may be the Sum of Absolute Difference (SAD) of pixel intensities. FIG. 12 shows an example of the motion estimation procedure.

According to one nonlimiting embodiment, the LBP/SVM-based system/method may identify the inner region (template) as half of the width and height of the original video frame. The search range may be, for example, ten pixels wider in width and height. When computing the SAD, the pixel intensities may be subsampled, for example, by four in horizontal and vertical directions in order to reduce the computational cost. For example, since the estimated motion vector is integer-valued, if the movement is actually floating-valued, it will be truncated to integer-valued. This may cause a problem in that the truncated error may propagate and sum up, leading to a large error. For example, if the actual movements between $frame_i$ and $frame_{i+1}$ are all (1.2, 1.2), the estimated integer-valued motion vectors will all be (1,1). Then when the movement from $frame_k$ to $frame_{k-5}$ is calculated as $MV_k+MV_{k-1}+ \ldots + MV_{k+4}$, the summation will be (5, 5) but the actual movement should be (6, 6). In order to prevent errors from propagating, for every five frames (as a nonlimiting example) the system may refine the motion vector $MV_{k+4}$ by applying motion estimation between $frame_k$ and $frame_{k+5}$ using the original $MV_k+MV_{k+1}+ \ldots + MV_{k+4}$ as the predicted motion vector and search the best match around the predicted motion vector. Preferably, this motion estimation procedure is fully autonomous and does not need any human input.

Figure 13:
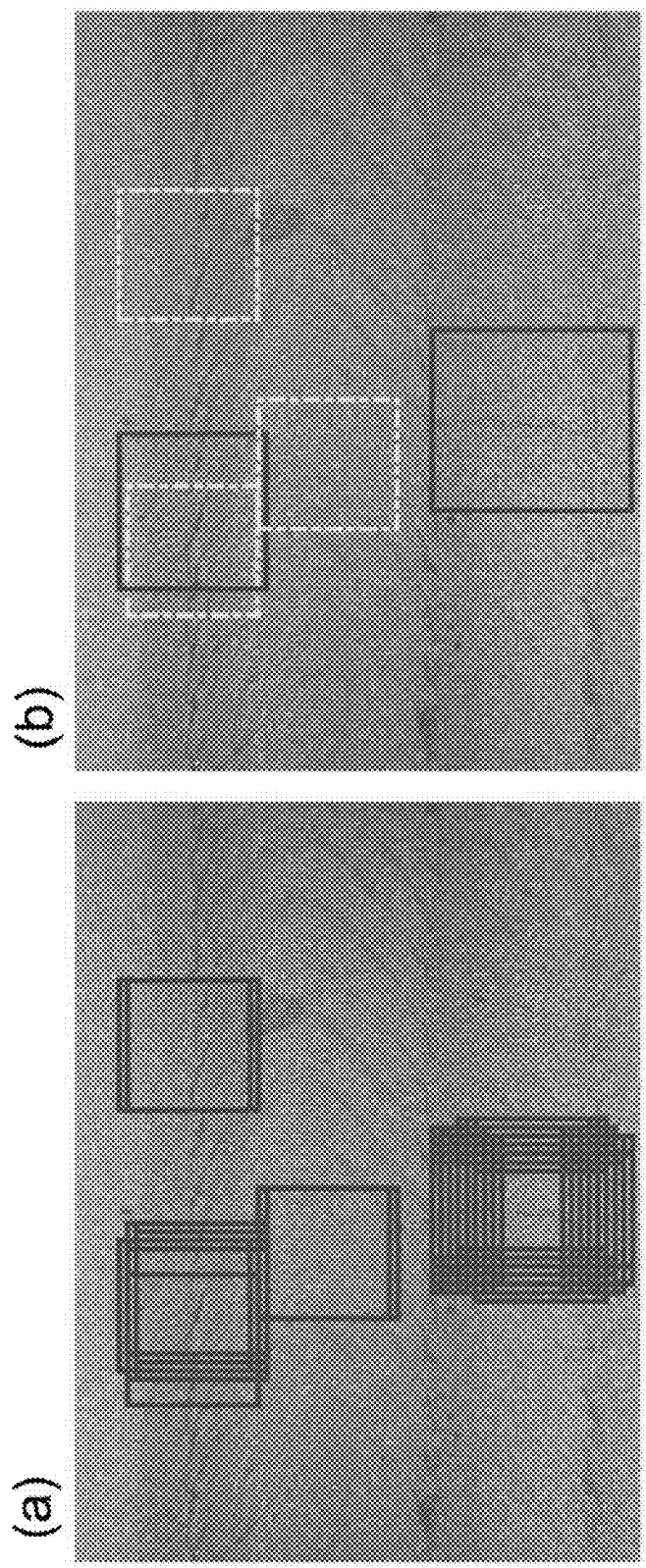
FIG. 13 represents crack patches and corresponding bounding boxes before (image "a") and after crack patch grouping (image "b"). The solid boxes contain at least five crack patches and the dashed boxes contain fewer than five cracks patches, which are preferably discarded.

Since cracks generally have a size that is larger than a 120×120 pixel patch, there will likely be several patches regarded as crack patches in a single frame. Consequently, the system may group these patches to form what will be referred to as a bounding box that frames a crack. For example, connected component grouping may be performed where two patches would be considered to be the same connected component if their centers were within sixteen pixels (e.g., twice the step size in patch scanning) in horizontal and vertical directions. In this way, a bounding box may be provided of each connected component formed from multiple patches. To filter out some non-crack patches that are falsely detected as crack patches, the connected components that are formed from fewer than, for example, five combined/connected patches may be discarded. FIG. 13 contains two images that show a frame with patches classified as crack (image "a"), and the result after crack patch grouping (image "b"). The gray dashed boxes in image "b" were discarded because they contained fewer than five patches.

Figure 14:
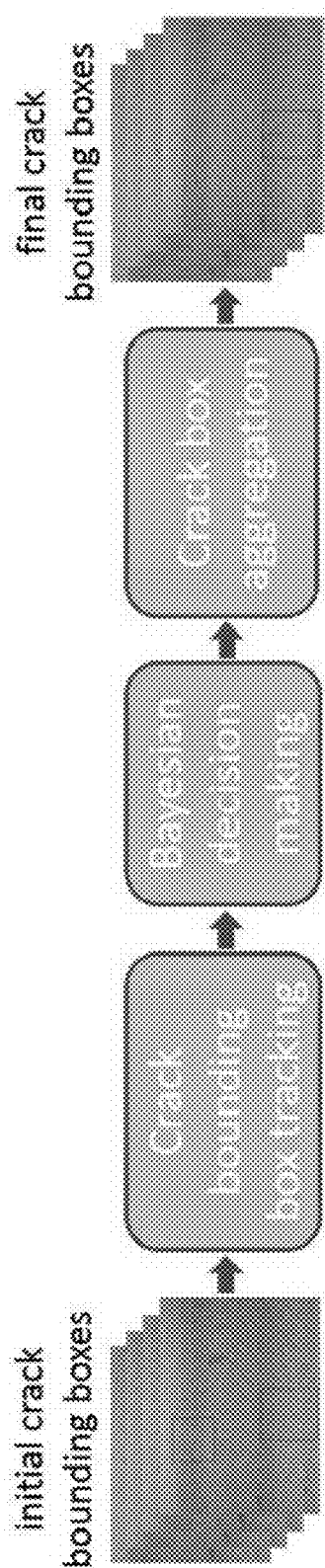
FIG. 14 schematically represents steps of a data fusion procedure in accordance with a nonlimiting aspect of the invention.

The LBP/SVM-based system separately analyzes each individual video frame independently of the other video frames. In order to enhance the accuracy and robustness of the crack detection, the data obtained from different video frames may be fused or combined in order to assign a probability to each detected crack. Notably, a crack might be detected in some frames but missed in others. By applying this data fusion scheme, the system takes advantage of video data and is capable of determining whether the bounding boxes are true positives (even though they are missed in some frames) or false positives. Consequently, this particular feature provides a significant benefit over conventional crack detection methods. FIG. 14 shows the steps in the Bayesian data fusion process.

To this end, the system may track each crack bounding box with other bounding boxes in nearby video frames to form a set of bounding boxes of the same crack in successive frames. Bayesian decision making may then be applied by considering the number of frames in which the same crack is successfully detected to determine whether it is an actual crack. Following this, the system may average the coordinates of the crack boxes of each specific crack to obtain a more accurate location for the crack.

After identifying several bounding boxes of cracks in different frames, the system tracks the cracks that appear in successive video frames by considering their spatial and temporal coherence. For example, to track a single crack that appears in several frames, the system may start by shifting the location of the largest bounding box in all frames by the estimated motion vectors in nearby frames until the bounding box moves out of the frame.

The shifted boxes (s-boxes) are the predicted locations of a crack in nearby frames; however, if there exist other boxes (o-boxes) with similar locations in nearby frames, they may be represented to the same crack. Thus, the area of overlap between s-boxes and o-boxes in nearby frames is checked. If more than, for example, seventy percent of an o-box is covered by the s-box, the o-box is considered to correspond to the same crack, and is labeled as a tracked box and tracked in adjacent frames. It is foreseeable that a crack might remain undetected in some frames. Therefore, during tracking, if a bounding box does not have overlap in the subsequent frame, the algorithm preferably searches the overlapping boxes in, for example, two following frames. If the algorithm does not identify any overlapping boxes in these three sequential frames, the algorithm may conclude that the patch contains a false positive or the crack has moved out of the frame. After checking all nearby frames, the next-largest box among non-tracked o-boxes is selected, and the same procedure is repeated until all o-boxes are tracked. Once the tracking process is complete, the results may include several crack groups containing crack bounding boxes in different frames, that is, it is likely that there are several tracked cracks that contain shifted bounding boxes in different frames. Consequently, the algorithm records the number of frames in which a crack is successfully tracked and the number of frames in which the crack is missing. This information may be used for Bayesian decision making to further enhance the robustness and accuracy of the detections.

Figure 15:
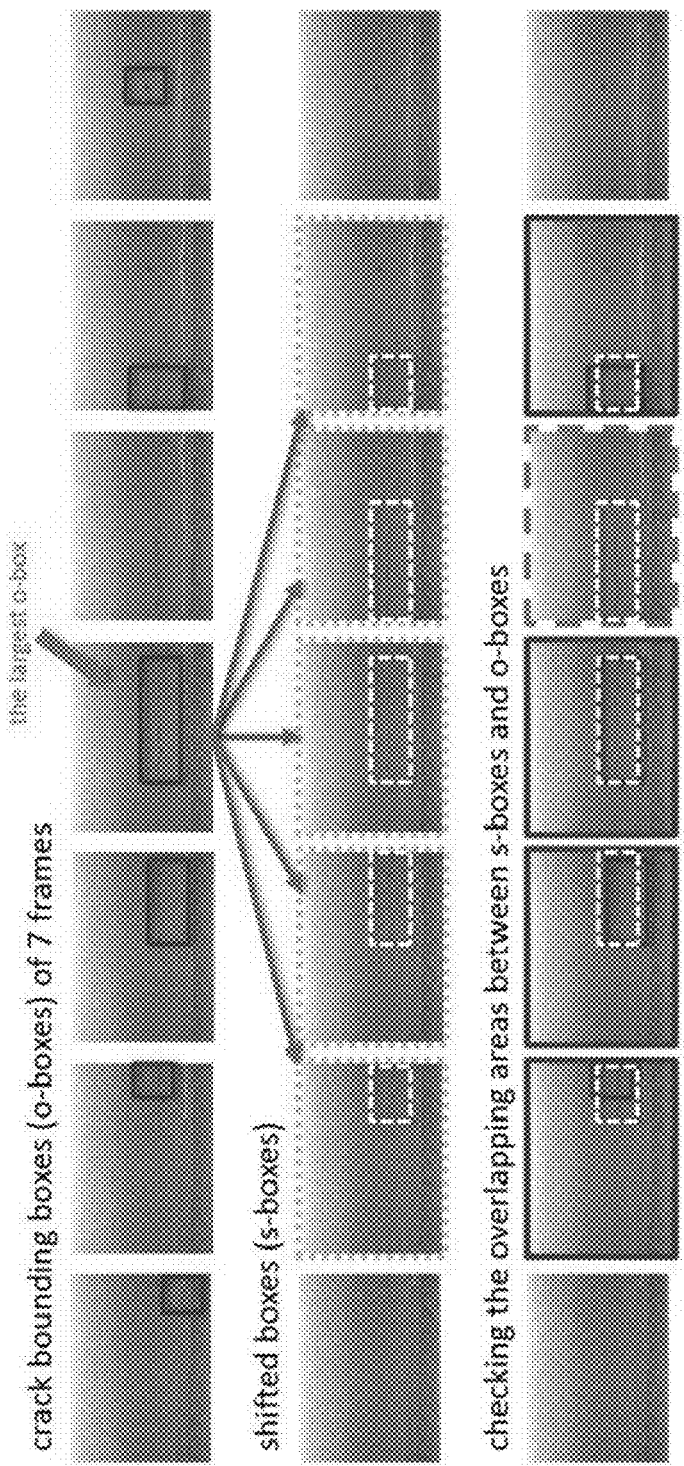
FIG. 15 represents steps of a crack bounding box tracking procedure in accordance with a nonlimiting aspect of the invention.

FIG. 15 shows a nonlimiting example of the crack tracking procedure discussed above. In this figure, six crack bounding boxes (o-boxes) appear in seven frames (top row of images). The largest bounding box (identified with an arrow) is selected and shifted to the middle five frames (dotted borders in middle row of images). The largest bounding box is not shifted to the first and last frames because this would cause it to move out of these frames. In these middle five frames, the overlapping areas between the shifted boxes (s-boxes) and other o-boxes are evaluated. In this example, the crack is successfully tracked in four frames (solid borders in bottom row of images) and not tracked in one (dashed border in bottom row of images).

As indicated previously, some of the cracks might not be detected in some frames and/or some background regions might be falsely detected as cracks. In order to confirm if the tracked cracks are really cracks or not, the Bayesian decision theory may be applied based on the number of frames the cracks are successfully tracked. As an example, for a potential crack tracked for n continuous frames, $D_i$ is the event (i.e., outcome) of tracking results of this crack in frame I, and AC is the event that the tracked crack is a true positive, and NC is the event that the tracked crack is a false positive. Given the tracking results $D_1, D_2, \ldots, D_n$, the posterior probability $P(AC \backslash D_1 \cap D_2 \cap D_3 \ldots \cap D_n)$ may be computed.

Since all $D_i$ are independent and identically distributed events, the posterior probability is:

$$P(AC \mid D_1 \cap D_2 \cap D_3 \ldots \cap D_n) =$$

$$\frac{P(AC) \times \prod_{i=1}^{n} P(D_i \mid AC)}{P(AC) \times \prod_{i=1}^{n} P(D_i \mid AC) + P(NC) \times \prod_{i=1}^{n} P(D_i \mid NC)}$$

where $P(D_i \mid AC)$ and $P(D_i \mid NC)$ are the classification (tracking/detection) accuracies of crack and non-crack, respectively, in a frame and can be empirically obtained by evaluating the frame-based crack detection accuracy of all frames of videos. $P(AC)$ is the probability that a certain region of a frame is a crack region, and is obtained by manually counting the number of cracks and the areas occupied by them in the videos, and $P(NC)=1-P(AC)$. For a set of bounding boxes corresponding to the same crack in different frames, if the posterior probability of being an actual crack is greater than, for example, 0.5, the system may determine that the bounding box set belongs to an actual crack; otherwise, the set does not belong to a crack, and may be deleted.

For instance, where $P(tracked \mid AC)=0.9$, $P(not\ tracked \mid NC)=0.6$, and $P(AC)=0.1$, if in 15 frames, a crack is successfully tracked in 11 frames but not tracked in 4 frames, then:

$$P(AC \mid D_1 \cap D_2 \ldots \cap D_{15}) =$$

$$\frac{0.1 \times 0.9^{11} \times (1-0.9)^4}{0.1 \times 0.9^{11} \times (1-0.9)^4 + (1-0.1) \times (1-0.6)^{11} \times 0.6^4} \approx 0.391$$

which is smaller than 50%, and therefore may be considered as a false positive.

After fusing data from multiple frames, the bounding boxes corresponding to a crack often have different dimensions in different frames. To address this, the system may aggregate the bounding boxes and generate a uniform bounding box for the crack of interest. To this end, all bounding boxes corresponding to a crack by area may be sorted, and the top 20% and bottom 30% of boxes (as nonlimiting examples) may be removed. This removes outlier boxes whose areas are larger or smaller than most other boxes. A larger percentage of small boxes are preferably removed because when a crack crosses the frame boundary, its bounding box is smaller, which does not represent the real size of the crack.

Figure 16:
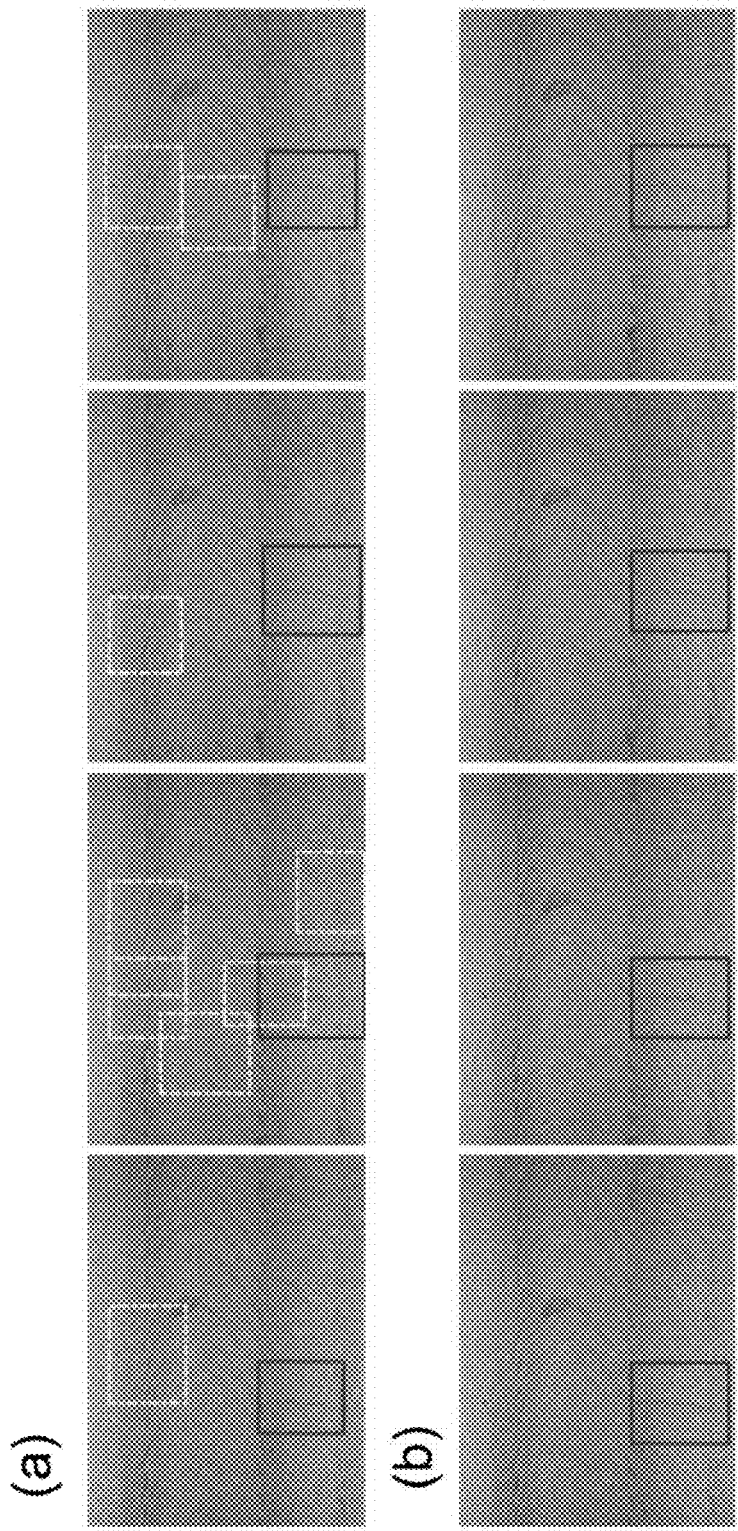
FIG. 16 represents exemplary crack boxes of four successive frames before (image "a") and after (image "b") Bayesian decision making and crack box aggregation. The dashed boxes are bounding boxes of false positives that are deleted after processing.

After removing the outlier boxes, the remaining boxes may be shifted by moving them with respect to the first (or any arbitrary) frame, averaging the shifted coordinates of the four corners of the boxes, and shifting back the average box to all frames. In other words, the system projects all bounding boxes on a single frame and averages the corner coordinates of the bounding boxes. FIG. 16 shows a sample of crack bounding boxes of four successive frames before and after Bayesian decision making and crack box aggregation. The white dashed boxes in image "a" are the bounding boxes of false positives, and are deleted after Bayesian decision making. The solid boxes are the actual crack boxes before (image "a") and after (image "b") crack box aggregation.

To decrease the time for detecting cracks, the methods and systems described above may optionally include integral LBP histogram and have algorithms implemented in C++ programming language. Furthermore, a two-stage SVM may be used to filter out non-crack regions efficiently.

The LBP/SVM-based systems and methods disclosed above use LBP, SVM, and data fusion with a Bayesian inference to detect cracks from videos with an 85% hit rate. In a second nonlimiting embodiment, systems and methods instead use Naïve Bayes with convolutional neural network (CNN) and spatial-temporal clustering (referred to herein as NB/CNN-based systems and methods) for detecting cracks from videos. In general, the systems and methods use a CNN architecture which detects crack patches much more accurately than the LBP/SVM-based systems and methods of the first embodiment, uses a clustering procedure that accords with the spatial-temporal coherence of cracks in videos, and uses a Naïve Bayes classifier based on the statistics which preferably discards false-positives.

Figure 17:
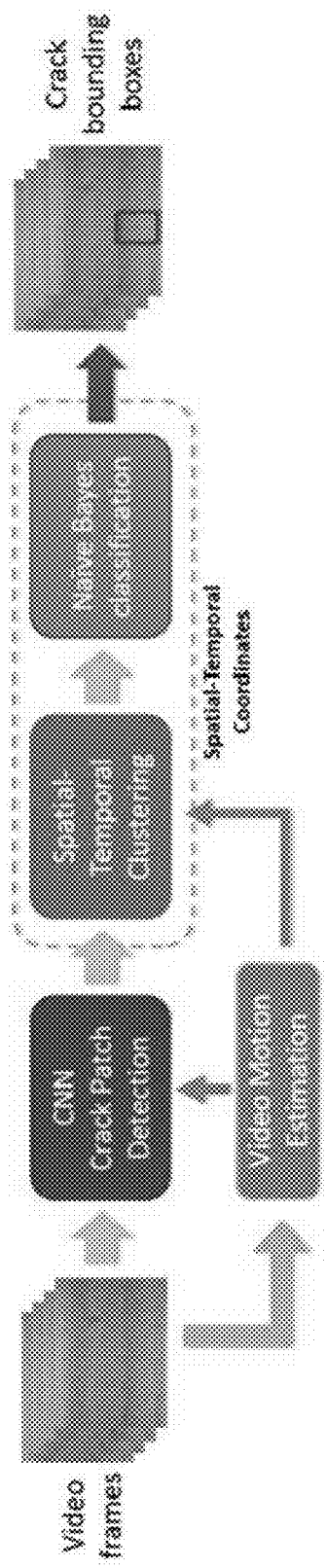
FIG. 17 schematically represents certain steps of a Naïve Bayes with convolutional neural network (NB/CNN) based crack detection method in accordance with a second nonlimiting embodiment of the invention.

FIG. 17 schematically represents steps in the NB-CNN method. "Video Motion Estimation" estimates the motion vector between every successive frame pair. "CNN Crack Patch Detection" applies the CNN to detect crack patches in the frames. "Spatial-Temporal Clustering" transfers crack patches to spatial-temporal coordinates, forms crack tubelets (a sequence of associated bounding boxes across time that contain the observations of the same surface texture feature), and groups the tubelets into crack clusters (groups of bounding boxes of the same surface texture feature). Finally, "Naïve Bayes Classification" determines whether a crack cluster is a real crack or a false positive.

"Video Motion Estimation" aims to estimate the frame movements for "CNN Crack Patch Detection" and "Spatial-Temporal Clustering." During the recordings, the camera's field of view and the surface-camera distance preferably remain constant. In such embodiment, only translation movements occur in the videos. As a result, the NB/CNN-based system may apply a block-based motion estimation to compute motion vectors between successive frame pairs. Based on template matching, the motion vector $MV_i$ is the displacement between an central inner block region in $frame_i$ and its best match among the search range in $frame_{i+1}$. The sum of absolute difference (SAD) of pixel intensities is used as the matching criterion. Having all the motion vectors, the movement $MOV_{k,k+n}$ from $frame_k$ to $frame_{k+n}$ equals $\Sigma_{i=k}^{k+n-1} MV_i$ for $n>0$. For accurate template matching, the inner block region preferably contains a sufficient number (e.g., more than 5,000) of pixels. Also, the search range is preferably large enough to cover the maximum movement in the video. In investigations leading to certain aspects of the present embodiment, the inner block region was half the width and height of the video frame (e.g., 360×270 pixels), the search range was ten pixels wider in width and height, and pixels were 1:16 sub-sampled when calculating the SAD to reduce computation cost.

Figure 18:
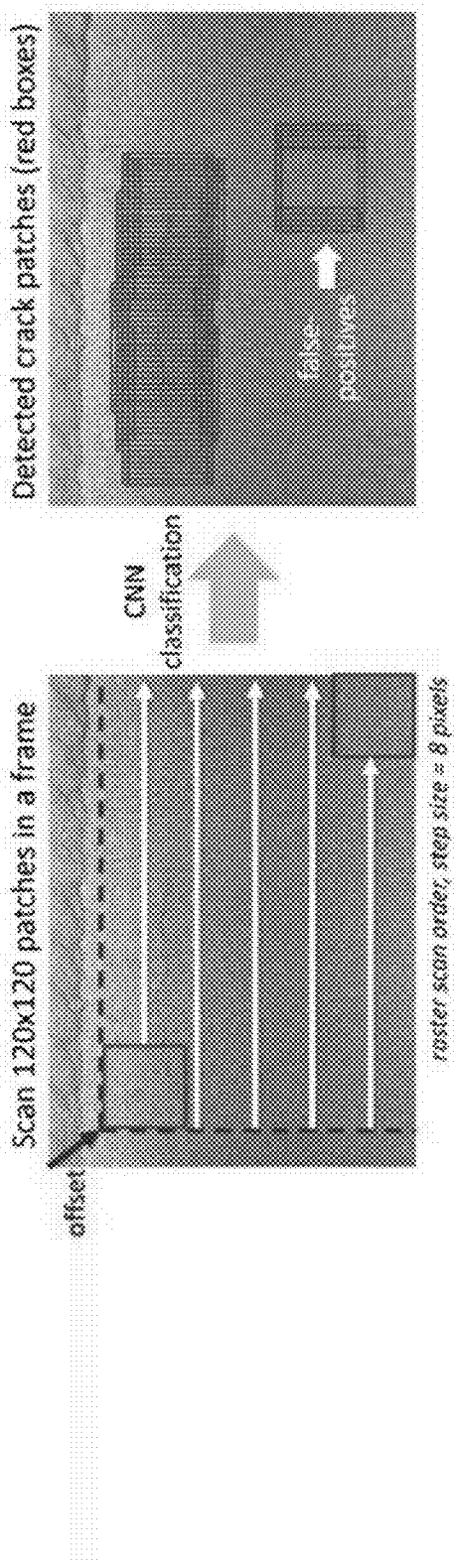
FIG. 18 schematically represents certain steps for detecting cracks in an individual video frame in accordance with a nonlimiting aspect of the invention.

For "CNN Crack Patch Detection," frames may be scanned with patches of size 120×120 pixels (as a nonlimiting example) in raster scan order with step size of, for example, eight pixels. Preferably, each scanning has a 2D offset ranging from (0,0) to (7,7) as illustrated on the left-hand side of FIG. 18. The offset of $frame_i$ may equaled-$MOV_{1,i}$ modulo eight (the step size). These offsets ensure the spatial-temporal consistency of patches explained in more detail below. After a scanning, the CNN classifies each patch as a crack or non-crack. The right-hand side of FIG. 18 shows nonlimiting samples of detected crack patches including some false-positives. These false-positives are preferably discarded by "Naïve Bayes Classification" in a subsequent step. As with the first embodiment, detecting a crack in every frame is unnecessary since successive frames have large overlapping areas. For example, the system may process one frame every second.

The CNN's computational model is composed of multiple layers that learn representative features of data with multiple levels of abstraction. As the data go in deeper layers, the depth (i.e., the last dimension) of the data also becomes larger than the origin. Thus, it is referred to herein as a deep learning technique. The basic layers include convolution, activation, pooling, and fully-connected layers. The first three aim to extract features from data and the last one stands for the final classifier. Some layers such as batch normalization and dropout layers are beneficial to prevent overfitting, accelerate training, and improve accuracy.

Figure 19:
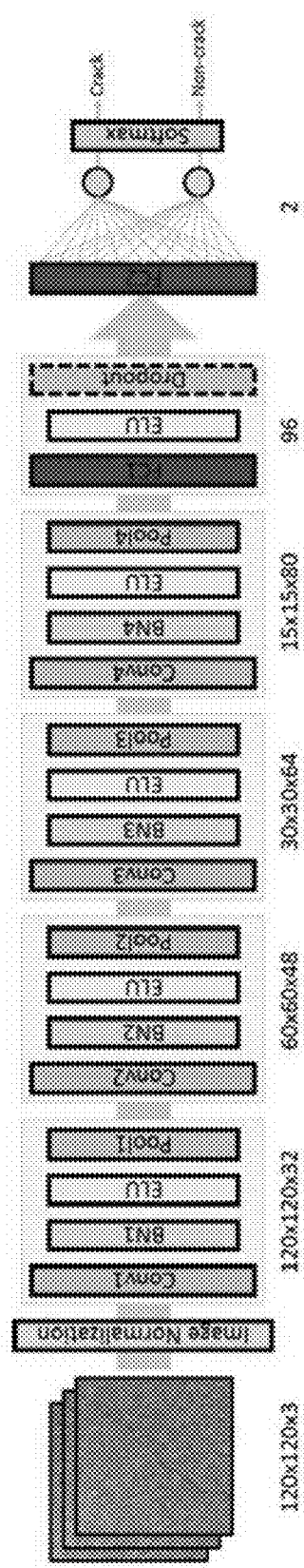
FIG. 19 schematically represents an exemplary CNN architecture in accordance with a nonlimiting aspect of the invention. The numbers below the layers indicate the data sizes in different layers. Conv1-4 are convolution layers, BN1-4 are batch normalization layers, Pool 1-4 are pooling layers, and FC1-2 are fully-connected layers.

FIG. 19 schematically represents a nonlimiting embodiment of the overall CNN architecture. In this example, the input is 3D data is a 120×120 image of R, G, and B channels. The image normalization linearly scales each channel to have zero mean and unit L2 norm. Then the data go through four series of convolution (Conv1-4), batch normalization (BN1-4), activation (ELU1-4), and pooling (Pool1-4) layers. After that, the data pass two fully-connected layers (FC1-2) with activation (ELU) and dropout layers in the middle. Finally, a softmax layer predicts whether input data is a crack or a non-crack. The numbers in FIG. 19 indicate the data sizes in different layers and Table 1 lists the configurations of the layers. The 3D numbers mean the width height depth of the data. The convolution layers change (increase) the depths and the pooling layers down-sample the data in width and height. In the end, the fully-connected layers (FC1-2) flatten the 3D data to 1D for classification.

Table 1. Exemplary CNN Layer Configurations.

|       | Input        | Kernel shape | # of kernels | Stride | Output       | # of variables |
|-------|--------------|--------------|--------------|--------|--------------|----------------|
| Conv1 | 120 × 120 × 3 | 11 × 11 × 3  | 32           | 1      | 120 × 120 × 32 | 11,648         |
| Pool1 | 120 × 120 × 32 | 7 × 7 × 1   | —            | 2      | 60 × 60 × 32  | —              |
| Conv2 | 60 × 60 × 32 | 11 × 11 × 32 | 48           | 1      | 60 × 60 × 48  | 185,904        |
| Pool2 | 60 × 60 × 48 | 5 × 5 × 1    | —            | 2      | 30 × 30 × 48  | —              |
| Conv3 | 30 × 30 × 48 | 7 × 7 × 48   | 64           | 1      | 30 × 30 × 64  | 150,592        |
| Pool3 | 30 × 30 × 64 | 3 × 3 × 1    | —            | 2      | 15 × 15 × 64  | —              |
| Conv4 | 15 × 15 × 64 | 5 × 5 × 64   | 80           | 1      | 15 × 15 × 80  | 128,080        |
| Pool4 | 15 × 15 × 80 | 3 × 3 × 1    | —            | 2      | 8 × 8 × 80    | —              |
| FC1   | 8 × 8 × 80   | 5120         | 96           | —      | 96           | 491,616        |
| FC2   | 96           | 96           | 2            | —      | 2            | 194            |

Each kernel has the same depth of the input and smaller width and height. The 3D convolution operation moves the kernel across the first two dimensions (dimensions of width and height) within the data with a step size (stride). For every location where the kernel moves, it performs a summation of element-wise multiplications of the kernel and the data. Then it adds the summation by a bias which is also a trainable variable (bias variable). All the summations of a kernel forms one channel of the output data, thus the output depth equals the number of kernel. In investigations leading to aspects of this embodiment, "same padding" was applied that pads zero values around the data such that the input and the output have the same width and height when stride equals one.

Batch normalization acts as a regularizer, enables higher learning rates to speed up training, and improves CNN's performance. During training, changes in the variables modify the output distribution of each layer. These changes accumulate and propagate to later layers, resulting in noisy input for them. To solve this issue, batch normalization linearly transforms the data in each channel such that they have a distribution of zero mean and unit variance. Then it linearly transforms the normalized data again using two trainable variables g and b. These two variables facilitate the representational power of the layers. The overall transformation is $BN(x_i)=y(x_i-u)/\sigma+\beta$ where $x_i$ is the data of a channel and u and $\sigma$ are channel mean and standard deviation of all the training data. The effect of the bias variable in the convolution layer is eliminated when subtracting u here. Thus the bias variable is omitted as its role is replaced by b in this layer.

The activation layer non-linearly transforms the data to generate a non-linear classifier, specifically, "exponential linear unit" (ELU) which uses the transformation:

$$f(x) = \begin{cases} x & \text{if } x > 0 \\ e^x - 1 & \text{otherwise} \end{cases} \text{ and } f'(x) = \begin{cases} 1 & \text{if } x > 0 \\ f(x) + 1 & \text{otherwise} \end{cases}$$

Besides having no upper bound and easy gradient computations, ELU allows negative activation such that the mean activations become closer to zero similar to batch normalization. In general, ELU is expected to outperformed other conventional activation functions, such as sigmoid function (e.g., $f(x)=\tan h(x)$) and rectified linear unit (e.g., $f(x)=\max(x, 0)$) regarding learning rate and generalization performance.

The purpose of the pooling layer is to apply (non-linear) transformation locally and down-sample the data. This layer has only one kernel with smaller width, height, and depth equal to one. The kernel has no trainable variables. For each channel of the input data, the layer moves the kernel across the dimensions of width and height with a step size (stride). For every location where the kernel moves, it takes either the mean or the maximum value of the data inside the kernel (referred as mean and max pooling). All these values form the output that has the same depth as the input. Again, investigations leading to aspects of this embodiment applied "same padding" such that the output had half the width and height of the input when stride equals two. Max pooling was used for pooling layers as it was believed that this works better for image data, since taking maximum values applies non-linear transformation and passes the strongest activation to later layers.

The convolution, batch normalization, activation, and pooling layers aim to extract features from the data where the data have spatial coherence in the first two dimensions. In contrast, the fully-connected layers break the coherence by flattening the input data into a 1D feature vector. This layer has several kernels of trainable variables whose sizes equal the vector length. For each kernel, it calculates the summations of element-wise multiplications of the kernel and the vector then adds the summation by a trainable bias. The first fully-connected layer (FC1) stands for a non-linear feature transformation as it is followed by another activation layer. The second fully-connected layer (FC2) with a softmax computation works as a logistic regression classifier that gives the final two scores (decision values) of being a crack and non-crack. The two scores range from zero to one and sum up to one. The CNN determines the input as a crack patch if the score of being a crack (the detection score, denoted as $s^c$) is greater than 0.5.

For a complex model containing a large amount of trainable variables, overfitting may be an issue wherein the model is too adaptive to the training data such that it fails to perform well for validation and test data. The dropout layer is intended to resolve this issue. Specifically, during each iteration of the training, the layer randomly disconnects some connections with a certain rate. This is an approximation of geometric model averaging for non-linear networks that would train a more generalized model. In investigations leading to aspects of this embodiment, a 50% dropout rate was applied.

To obtain preferred variables in the convolution, batch normalization, and fully-connected layers, stochastic gradient descent (SGD) may be applied with a simple momentum. For such embodiment, the values of the variables may be initially randomly assigned. Each SGD iteration takes a batch of n image patches and their labels $y_i$ as the input. For example, $y_i=0$ may mean the patch is a non-crack and $y_i=1$ may mean the patch is a crack. Then it calculates the gradients and updates the variables' values. After all the patches are taken (referred to as one epoch), SGD randomly reorders the patches and continues the next iteration. It ends according to a preset iteration (or epoch) limit. The loss function L may be defined as $$L = \sum_{i=1}^{n} \sum_{j=0}^{1} \{y_i = j\} \log S_{ij} + \lambda \sum w_k$$

where $\{\bullet\}$ is the indicator function, $S_{ij}$ is the detection score of being a crack (j=1) or non-crack (j=0), $w_k$ is the variable value of the fully-connected layers, and $\lambda$ is the regularization weight. The first term penalizes the miss-classifications and the second prevents large variable values in the fully-connected layers that cause overfitting. Each variable $w_p$ may be updated as $$w_p \leftarrow m \cdot w_p - \tau \frac{\partial L}{\partial w_p}$$

where the partial differential is the gradient, $\tau$ is the learning rate, and m is the momentum. The standard SGD might have very slow convergence rate after the initial steep gains. The momentum aims to include inertia that could move the objective much faster along the shallow ravine during the optimization.

In investigations leading to aspects of this embodiment, the training took place on an Exxact™ deep learning Linux® server with Ubuntu® 14.04 operating system. It had four Intel® Xeon® E5-2620 v4 central processing units (CPUs), 256 GB DDR4 memories (double data rate fourth-generation synchronous dynamic random-access memory), and four NVIDIA® Titan X Pascal™ graphics processing unit (GPU). TensorFlow® (an open source software library for numerical computation using data flow graphs) built by Google® was used to train the CNN in the Python programming language. The batch size n=64, the initial learning rate t=0.002 s which decayed by 0.1 s every 350 epochs, and the regularization weight l=0.0001 were used. One GPU accelerated the training which converged after 70 epochs (32,535 seconds).

Figure 20:
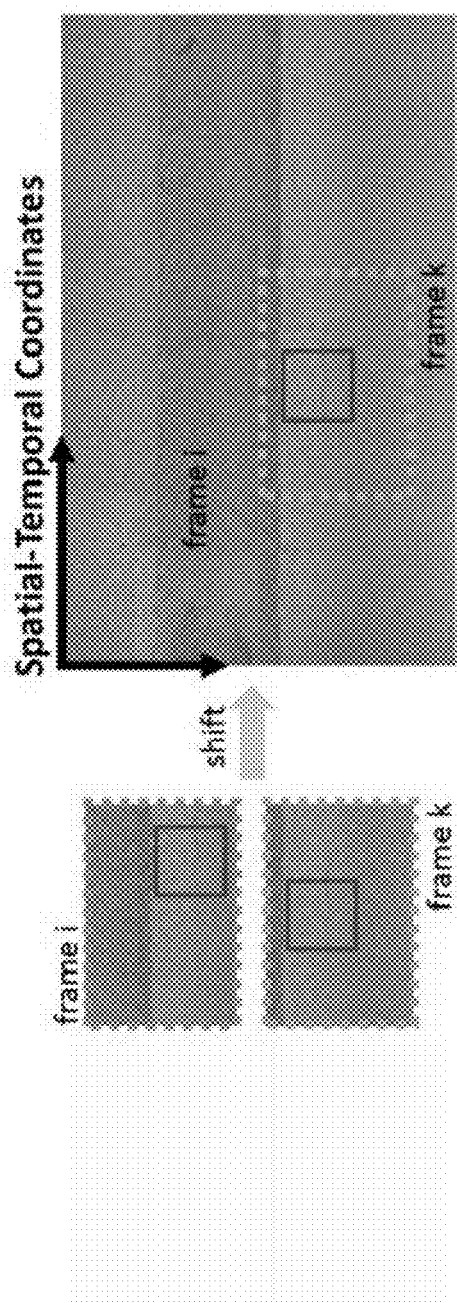
FIG. 20 represents an example of a spatial-temporal coordinates transferring process in accordance with a non-limiting aspect of the invention. $Frame_j$, and $frame_k$ both observe a crack patch. After the transferring, the shifted patches correspond to the same crack patch on the physical surface in the spatial-temporal coordinates.

One major advantage of detecting objects (surface texture feature) in videos is that an object could be observed at different times. Analyzing more observations would result in a more robust detection rather than having only one observation in an image. After getting the detection score $s^c$ of each patch in different frames from "CNN Crack Patch Detection", spatial-temporal clustering is used to form crack clusters of the same cracks based on their spatial-temporal coherence. This process transfers the patches to the spatial-temporal coordinates (s-t coordinates) where the coordinates represent the physical locations of the surfaces. To this end, it shifts every patch in frame, by $-MOV_{1,j}$. The shifted patches with the same position in the s-t coordinates correspond to the same patch on the physical surface. FIG. 20 shows an example of the transferring. Both frame$_i$ and frame$_k$ observe a crack patch. After the transferring, the shifted patches correspond to the same crack patch on the physical surface in the s-t coordinates. The offsets of the scannings in "CNN Crack Patch Detection" compensate the frame movements to align shifted patches such that the distances between them equal the step size. Without the offsets, the distances will vary and depend on the frame movements.

All the shifted patches with the same position in the s-t coordinates forms a "tubelet" if at least one of them has the detection score $s^c>0.5$. As used herein, a "tubelet" is a sequence of associated bounding boxes across time that contain the observations of the same object. Thus, a tubelet contains the observations (i.e., the $s^c$s of the patches) of a physical location on the surface at different times in the video. In this way, miss-detected crack patches may be included in tubelets. For falsely-detected non-crack patches, their tubelets would contain lower $s^c$s and "Naive Bayes Classification" will discard them. Each tubelet only presents a partial of a crack. The procedure spatially groups nearby tubelets into crack clusters in the s-t coordinates based on the hierarchical clustering. The clustering may use Euclidean distance as the criterion with the cutoff equal to, for example, 20 pixels.

To determine whether a tubelet is a crack, a general machine learning classifier requiring fixed-size input (e.g., SVM) is not applicable since each tubelet has different number of patches (observations). An intuitive way is to determine based the number of crack patches ($s^c>0.5$) or the sum of the $s^c$s of that tubelet. Instead, the present embodiment preferably employs Bayesian inference that provides a more robust classification. For example, assume a tubelet has n patches, $P(C_{crk}|s_1^c, \ldots, s_n^c)$ is the posterior probability of being a crack and $P(C_{ncrk}|s_1^c, \ldots, s_n^c)$ is for a non-crack. The inference classifies the tubelet as a crack if $$\frac{P(C_{crk}|s_1^c, \ldots, s_n^c)}{P(C_{ncrk}|s_1^c, \ldots, s_n^c)} > \theta$$

where $\theta$ controls the sensitivity of the classification. Since the CNN obtains each $s^c$ independently, it may be assumed that the naïve conditional independence assumption that $f(s_{i+1}^c|s_{i+1}^c, \ldots, s_n^c, C) = f(s_i^c|C)$ where $f(\bullet)$ is the probability density function (PDF). Rewriting the above equation and taking the log on both side yields $$\log \frac{P(C_{crk}) \prod_{i=1}^{n} f(s_i^c|C_{crk})}{P(C_{ncrk}) \prod_{i=1}^{n} f(s_i^c|C_{ncrk})} > \theta \text{ or}$$

-continued $$\sum_{i=1}^{n}(\log f(s_i^c \mid C_{crk}) - \log f(s_i^c \mid C_{ncrk})) = \sum_{i=1}^{n}H_{NB}(s_i^c) > \theta_t$$

where $\theta_t = \log \theta - \log P(C_{crk}) + \log P(C_{ncrk})$ which controls the sensitivity. Estimating the prior probabilities P(C)s is not necessary since $O_t$ already contains them. Applying the CNN to validation data could estimate the statistics for the likelihood functions $f(s_c \mid C)$s and get $H_{NB}(\bullet)$ that converts the detection score to a likelihood gain. This procedure computes the summation of all the likelihood gains of the tubelet. If the summation is greater than $\theta_t$, it classifies the tubelet as a crack. Otherwise, it discards the tubelet for being a false-positive (non-crack). As a nonlimiting example, $\theta_t$ may be equal to −28.

Figure 21:
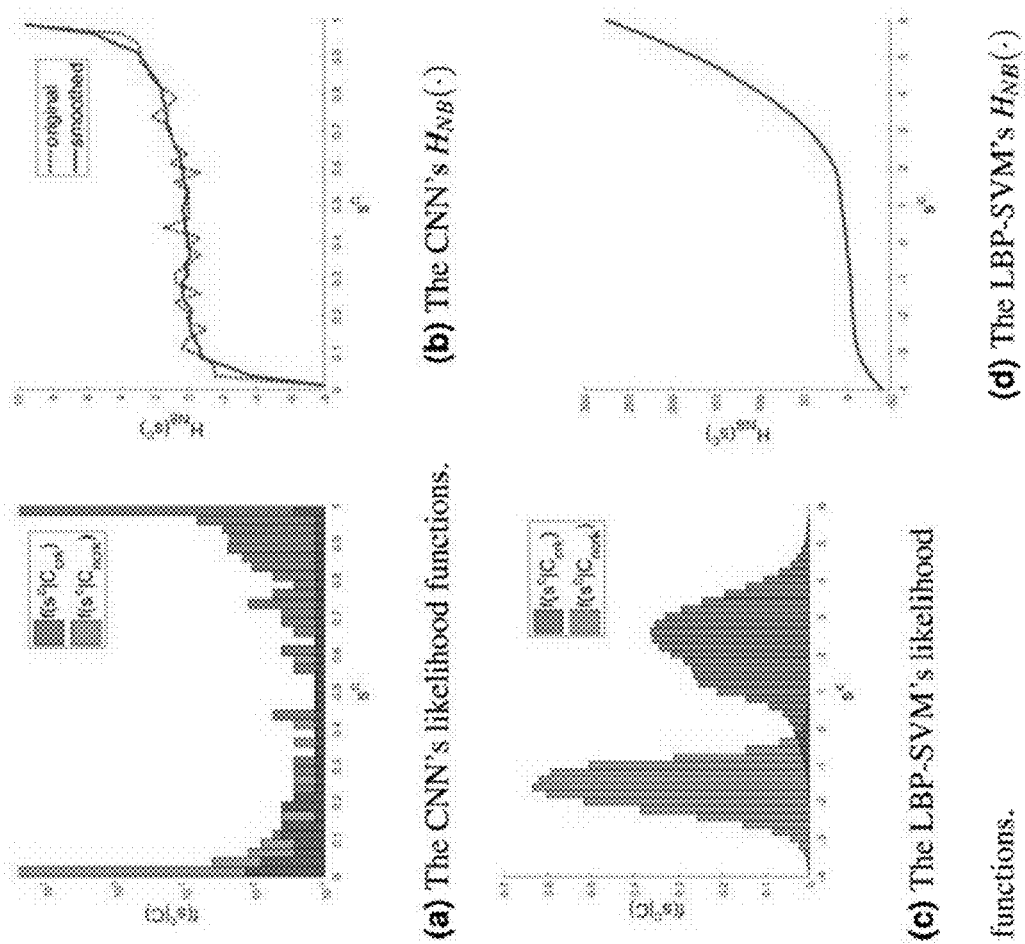
FIG. 21 includes plots representing the likelihood functions and $H_{NB}(\bullet)$s estimated using validation data. The y-axis in plot "a" uses log scale.

Images "a" and "b" of FIG. 21 show the estimated likelihood functions and $H_{NB}(\bullet)$ of the CNN in investigations leading to aspects of this embodiment. The y-axis in image "a" uses log scale since more than 98% of the samples lie in the first (last) bar of the histogram. The $H_{NB}(\bullet)$ is approximately an increasing function which matches the intuition that a higher detection score should result in a larger likelihood gain.

After discarding false-positive tubelets, for each remaining crack cluster the NB/CNN-based system summed up the likelihood gains again for all the tubelets in the cluster. If the summation is greater than another threshold $\theta_c$, it regards the cluster as a real crack. Then it outputs the crack bounding boxes of the cluster in the frames where the cluster appears in. $\theta_c$ controls the sensitivity of the overall detection. In the above-noted investigations, $\theta_c$ equaled 8.7 having a 98.3% hit rate against 0.1 false-positive per frame.

Figure 22:
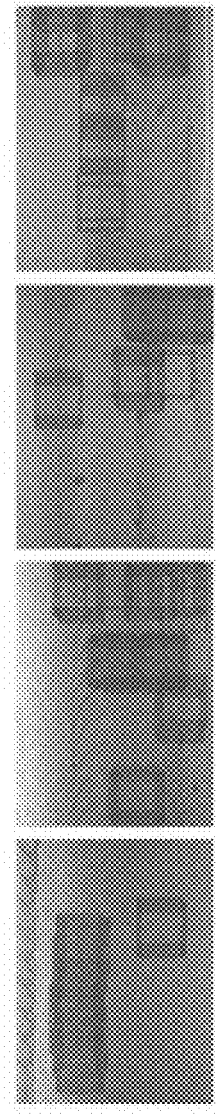
FIG. 22 represents images containing exemplary crack patches and bounding boxes before and after Naïve Bayes classification. Images "a" include crack patches with false positives, images "b" include crack patches after discarding non-crack tubelets, and images "c" include bounding boxes of crack clusters (solid boxes) and ground truths (dashed boxes).
Figure 22:
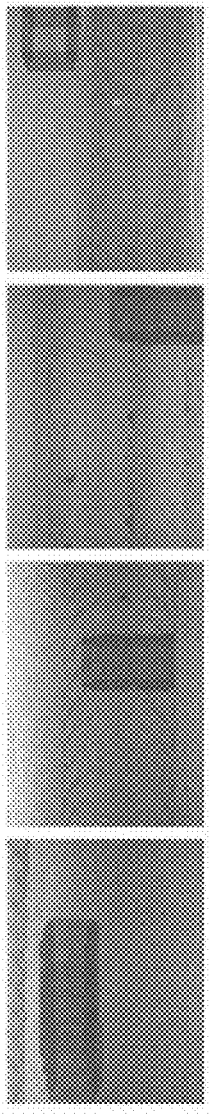
Figure 22:
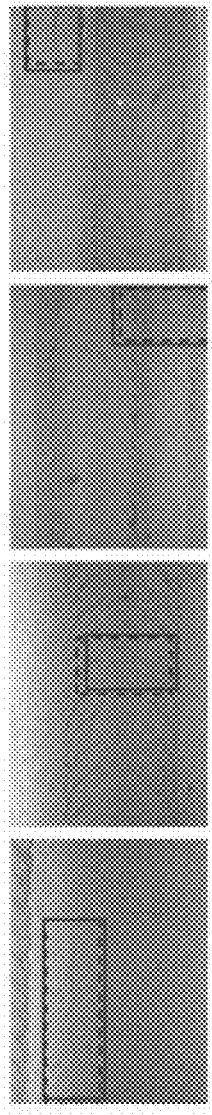

The NB/CNN-based system discards non-crack tubelets first since tubelets have stronger spatial-temporal coherence than clusters. All the patches in a tubelet correspond to a physical location. Thus all of them should simultaneously be crack or non-crack patches. On the other hand, a non-crack tubelet might happen to be adjacent to crack tubelets. Without discarding non-crack tubelets first, a cluster might be a mixture of crack and non-crack tubelets. This will affect the Bayesian inference and the shape of crack bounding boxes. Images "a" and "b" of FIG. 22 show samples of crack patches before and after these steps were completed. Although a large amount of false-positive patches exist, the system discards their tubelets successfully. Hence the bounding boxes of clusters could truly represent real cracks as shown in image "c" of FIG. 22.

Nonlimiting embodiments of the invention will now be described in reference to experimental investigations leading up to the invention.

In investigations leading to the first embodiment, the average processing time for a 720×540 frame under various method parameters was evaluated on a computer system running Windows® 7 64-bit operating system and having an 8-core Intel® i7-4790 CPU and 8 GB RAM. The LBP extraction was implemented in MATLAB® and C++, with and without the use of the integral histogram. SVM classification was carried out using LIB SVM (a library for support vector machines) in C++. Table 2 shows how the integral histogram and the two-stage SVM shortened processing time. As shown in Table 2, the integral histogram can save 61% computation time for LBP extraction, and implementing it in C++ saves up to 95% computation time. For classification, the two-stage SVM saved 80% computation time, since most patches were not cracks and where therefore filtered out in the first stage of the linear SVM. The average processing time was 0.64+1.23=1.87 s for a 720× 540 frame with integral histogram and two-stage SVM implemented in C++.

TABLE 2

Average processing time of crack detection for a 720 × 540 frame using various methods and programming languages.

| | LBP extraction | | | Classification | |
|---|---|---|---|---|---|
| | without integral histogram MATLAB® | with integral histogram MATLAB® | with integral histogram C++ | RBF SVM C++ | 2-stage SVM C++ |
| Processing time per frame (sec.) | 32.15 | 12.65 | 0.64 | 6.08 | 1.23 |

Figure 23:
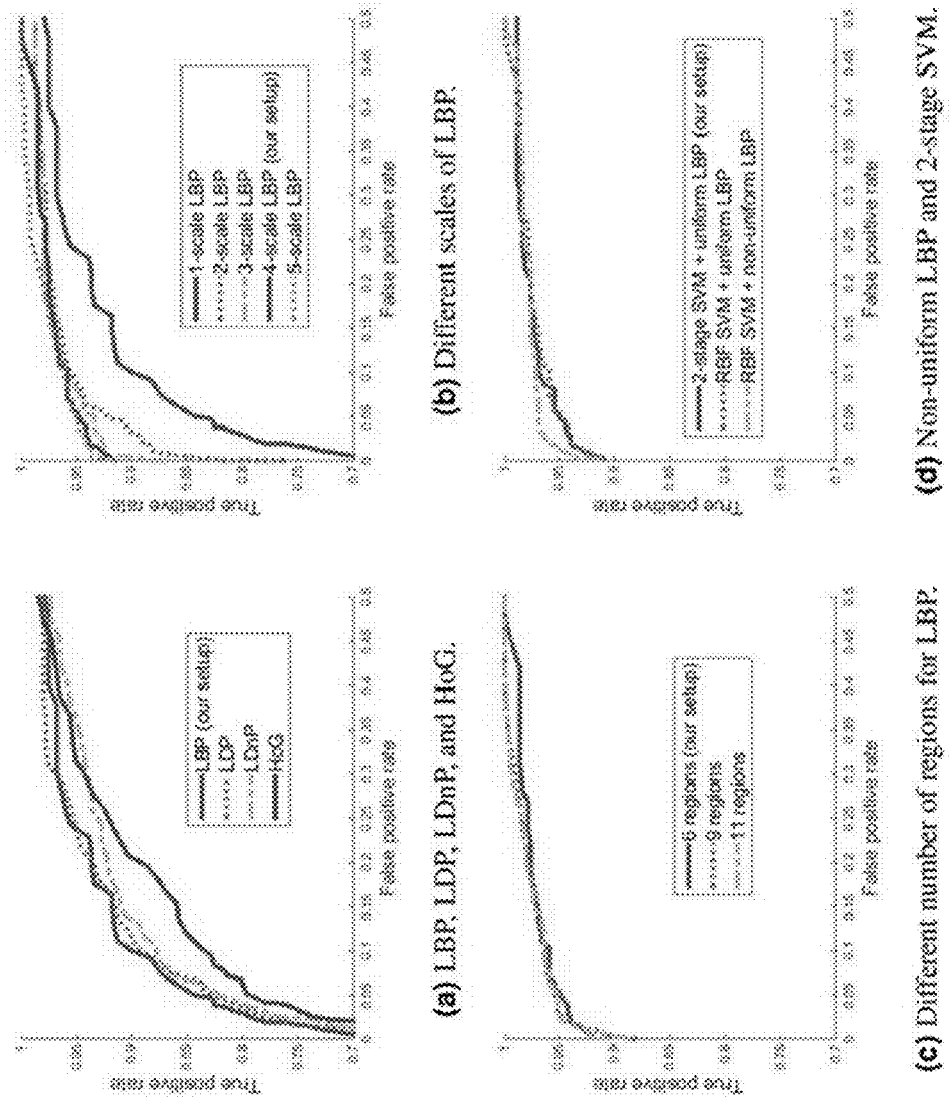
FIG. 23 includes plots representing receiver operating characteristic (ROC) curves of different configurations of classifiers and feature descriptors.

To evaluate the performance of the LBP/SVM-based system, 80% of images for training and 20% of images for testing from 2272 crack and 4153 non-crack images were randomly selected. FIG. 23 shows the receiver operating characteristics (ROC) curves of different feature descriptors and classifiers. All curves were generated using RBF SVM, except for one curve in image "d" that used two-stage SVM. In general, performance was evaluated based on true-positive rates when the false-positive rate was low (e.g., 0.05 to 0.20). A configuration with a high false-positive rate is unpractical, since there would be too many false positive patches in a frame during scanning.

Figure 24:
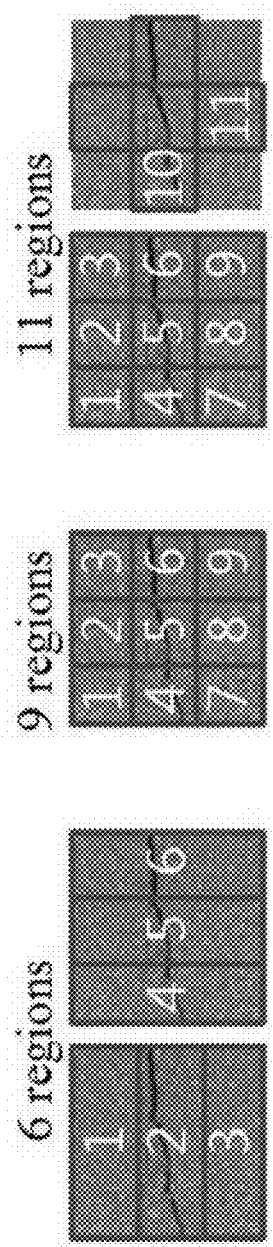
FIG. 24 represents three types of regions for extracting LBP features. For example, the "6 regions" image represents six regions inside a 120×120 patch that may be used for computing histograms including three rectangular regions that equally divide the patch in horizontal directions and three regions in vertical directions.

In addition to LBP, three other surface texture descriptors called Local Directional Pattern (LDP), Local Directional Number Pattern (LDNP), and Histogram of Gradients (HoG) were evaluated. Similar to LBP, LDP and LDNP also compare the intensity of pixels with their neighbors but they use different approaches to describe the surface texture feature and compute the histograms. HoG computes the histograms of gradient values of predefined blocks in a patch. Since LDP and LDNP do not support multi-scale features, a one-scale LBP with a 3×3 block was used. Six regions (see FIG. 24) were used for LBP, LDP, and LDnP. For HoG, the blocks were optimized to enhance its performance. The feature vector dimensions of LBP, LDP, LDnP, and HoG were 354, 336, 384, and 648, respectively. These studies showed that LBP yielded the best performance when the false positive rate was below 0.3. Thus, the LBP descriptor was used in the above-described embodiment.

Image "b" of FIG. 23 shows the ROC curves of LBP for different scales, where it seems that a greater scale leads to higher accuracy. However, when the false positive rate was below 0.2, the results for four- and five-scale LBP were very close. Thus, four-scale LBP was chosen for the first embodiment because it has smaller feature dimension than five-scale LBP.

The selection of regions within a patch to compute LBP features is an important factor that affects the accuracy of patch classification. In image "c" of FIG. 23, nine square regions that equally divided a patch into 3×3 regions (see FIG. 24) were used to generate the "9 regions" curve. In addition to these nine regions, two rectangular strips that covered the central portion of the patch in horizontal and vertical directions (see FIG. 24) were used to generate an "11 regions" curve. The performances of the "9 regions" and "11 regions" setups were very close, and the "6 regions" setup had comparable true positive rates when the false positive rate was between 0.05 and 0.20. Thus, six regions was used in the first embodiment, which had the smallest feature dimension and, consequently, was computationally most efficient.

Image "d" of FIG. 23 shows the comparison between two-stage SVM and RBF SVM as well as the effect of uniform and non-uniform LBP. As seen in the figure, the performances of the "RBF SVM+uniform LBP" setup and the "two-stage SVM+uniform LBP" setup were very close, which means that the two-stage SVM not only maintains performance, but also saves 80% of computation time in comparison with the RBF SVM. The RBF SVM+non-uniform LBP curve used four-scale non-uniform LBP to extract feature vectors with feature dimension of 256×4×6=6144, whereas the other curves used four-scale uniform LBP. Although non-uniform LBP yielded slightly better performance than uniform LBP, its feature dimension was approximately three times larger than that of uniform LBP, which resulted in a considerably longer processing time. For this reason, uniform LBP was chosen for the first embodiment due to its time efficiency.

Table 3 summarizes the error rates of different classifiers using LBP features. Naïve Bayes is a linear classifier where coefficients are computed with strong independence assumptions between features. The second and third classifiers used the Bayesian decision rule whereby the probability density function (PDF) was estimated using maximum likelihood estimation (MLE) and the Parzen window. The fourth classifier was also a linear classifier where the coefficients were computed based on linear discriminant analysis (LDA). Table 3 shows that the linear SVM and the RBF SVM outperformed other classifiers. The experiments showed that the LBP-SVM classifier leads to 0.95 true positive rate when the false positive rate is 0.05. It only needed 1.87 seconds to process a 720×540 frame, and thus was both accurate and efficient.

TABLE 3

The error rates of different classifiers.

| | Naïve Bayes | Bayes with MLE | Bayes with Parzin window | Linear classifier with LDA | Linear SVM | RDF SVM |
|---|---|---|---|---|---|---|
| Error Rate | 0.372 | 0.326 | 0.107 | 0.078 | 0.045 | 0.025 |

Figure 25:
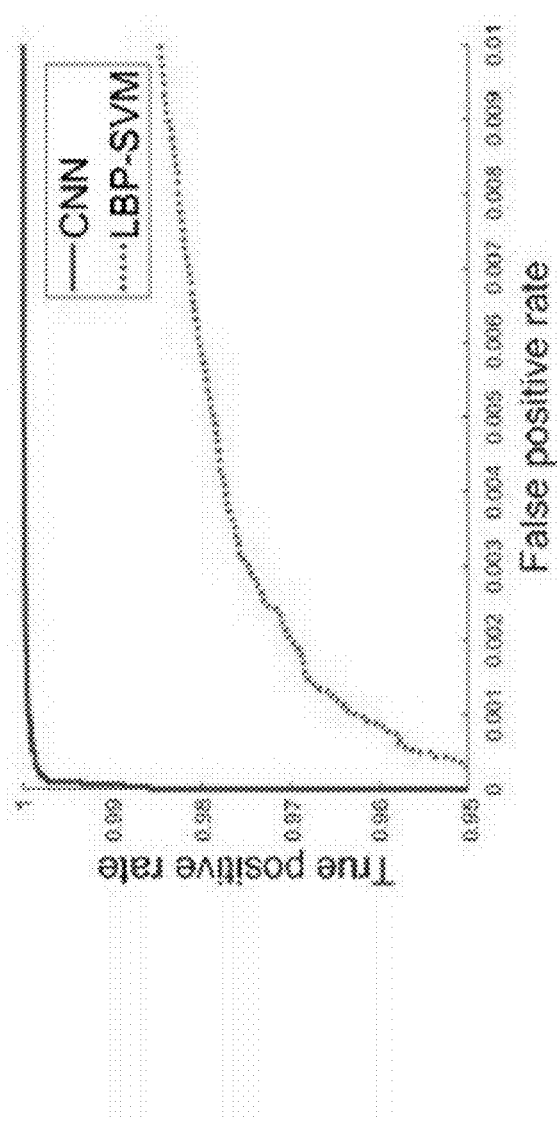
FIG. 25 is a plot representing ROC curves of a CNN classifier and a LBP-SVM classifier.

To evaluate the second embodiment and CNN's performance for crack patch detection, all of the 147,344 crack and 149,460 non-crack image patches described above were used for validation. It took 80% the image patches to train and 20% to validate the CNN and generate the receiver operating characteristic (ROC) curves. FIG. 25 demonstrates the ROC curves of the CNN and the LBP-SVM where the true positive rate (TPR) is the number of true positives (crack patches) divided by the total number of positives. The false positive rate (FPR) is defined in a similar manner. A classifier with low FPR (e.g., smaller than 1%) is practical to detect crack patches without having too many false-positives during a frame scanning. FIG. 25 indicates that the CNN reaches high TPR much faster than the LBP-SVM. With 0.1% FPR, the CNN achieves 99.9% TPR while the LBP-SVM has only 96.2% TPR. This means while the CNN miss-detects 0.1% the crack patches, the LBP-SVM might miss-detect 3.8%, that is, 38 times that of CNN.

Figure 26:
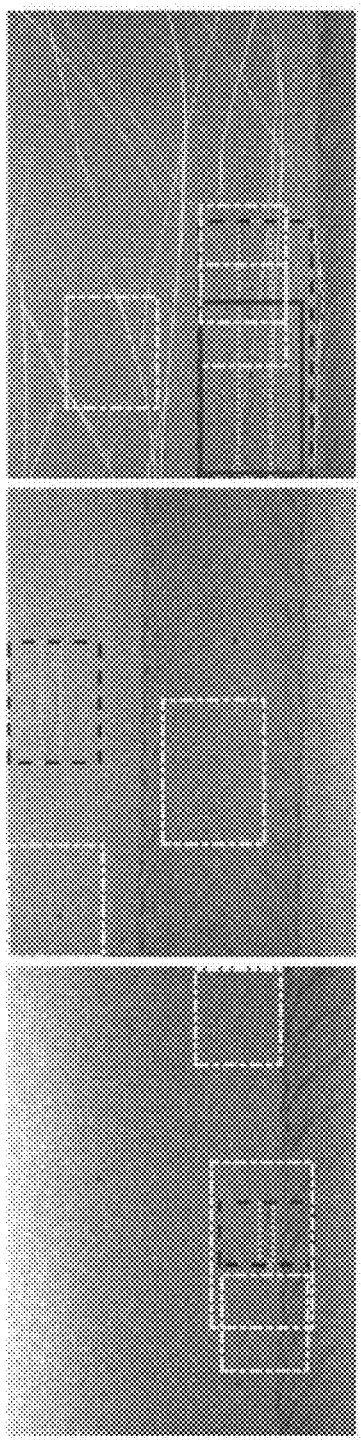
FIG. 26 includes images containing crack bounding boxes of the same frames before (image "a") and after (image "b") Bayesian data fusion. The dotted boxes are manually labeled ground truth boxes, the dark-colored dashed boxes are extended ground truth boxes, the solid boxes are detected crack boxes that hit ground truth boxes, and the white-colored dashed boxes are false positive boxes.
Figure 26:
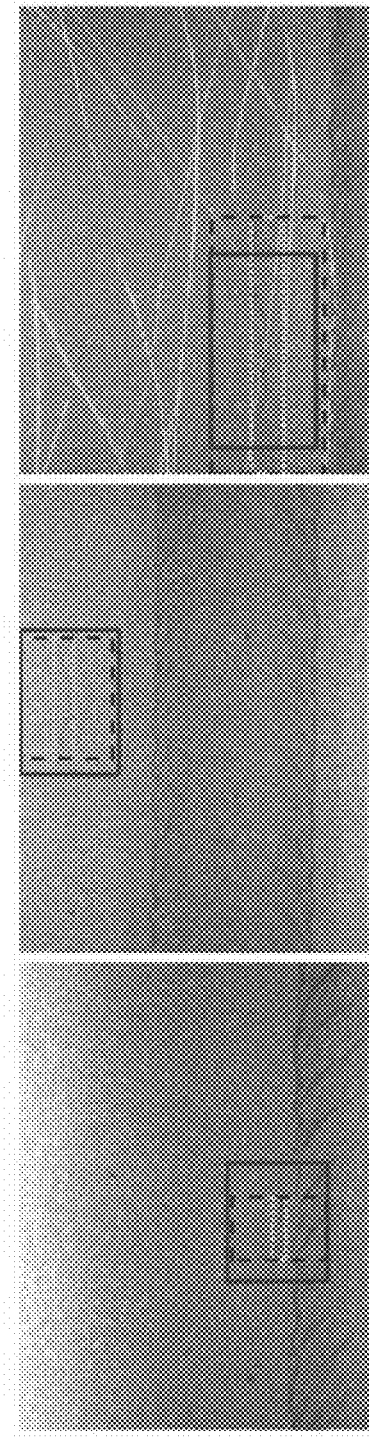
Figure 27:
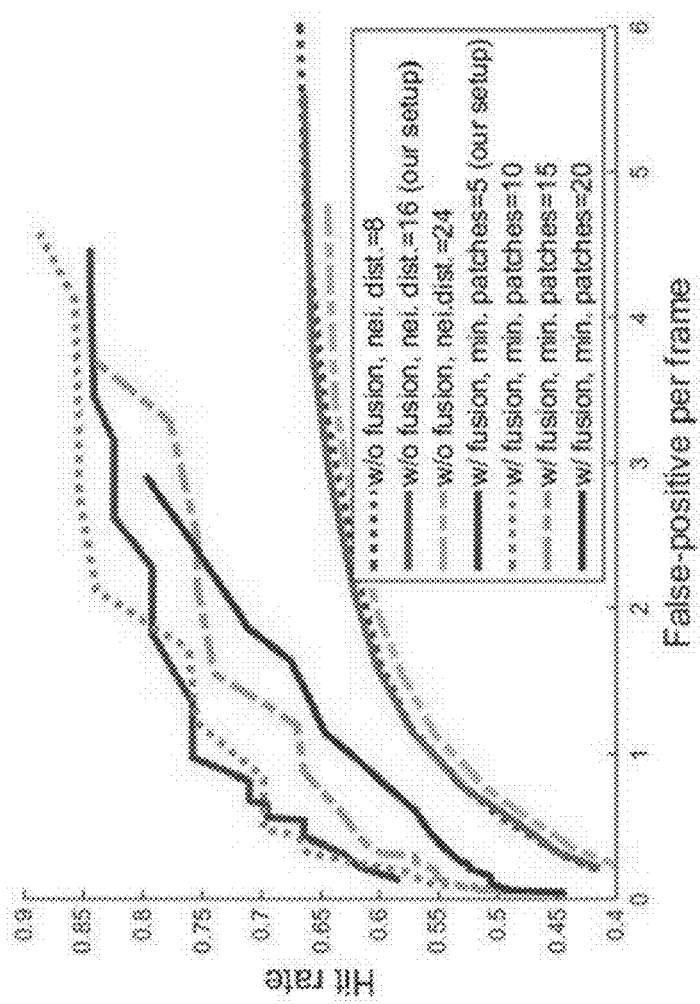
FIG. 27 is a plot representing hit rate versus false positive-per-frame of a LBP/SVM-based system (hit threshold=50%).

To evaluate the overall performance of the proposed method for video frames, 64 video segments were selected, where each segment was 10 to 17 seconds long. Each video segment included a crack. One frame per second was selected as the processing speed, and the total number of processed frames was 1,002. To generate the ground truth crack bounding boxes in each frame, the tightest bounding box for each crack was first manually identified. Since the bounding boxes obtained from with the first embodiment were generated by grouping the 120×120 patches, these bounding boxes were slightly larger than the actual ground truth boxes. In order to conduct a fair evaluation, each ground truth box was symmetrically extended by 120 pixels in width for vertical cracks and in height for horizontal cracks. FIGS. 26 and 27 show the manually labeled (light gray dashed) and extended (dark gray dashed) ground truth boxes. A detected crack box hits an extended ground truth box if the ratio of overlapping area, $A_0$, obtained from the following formula is greater than 50% (hit threshold):

$$A_0 = \frac{\text{area}(B_d \cap B_{gt})}{\text{area}(B_d \cup B_{gt})}$$

where $B_d$ is the detected box and $B_{gt}$ is the extended ground truth box.

FIG. 26 shows samples of crack bounding boxes of the same frames before and after Bayesian data fusion. The white dashed false positive boxes were removed and two red boxes were restored by Bayesian decision making. In image "b" of FIG. 26, the crack box aggregation also moved the red box in the right frame closer to the location of the ground truth box, which showed how the proposed data fusion scheme can improve the reliability of crack bounding boxes.

FIG. 27 shows the hit rate versus false positive-per-frame curves for the proposed method with different settings. Table 4 shows the hit rates when the false positive-per-frame was 1. In FIG. 27 and Table 4, the "neighbor distance" presents the maximum distance between two patches such that they would be considered connected, and the "minimum patches" correspond to the minimum number of connected patches inside a bounding box in crack patch grouping.

In FIG. 27, the three graphs without Bayesian data fusion have different neighbor distances and the four graphs with fusion have different minimum numbers of connected patches for crack patch grouping. Based on the detection results and the graphs without tracking, settings included P(tracked\AC)=0.60, P(not tracked\NC)=0.85, and P(AC)=0.15 in Bayesian decision making. Note that unlike general scanning patch-based object detection, where a detected patch can approximately represent the bounding box of the object, the cracks here had irregular sizes and shapes; thus, the bounding box was formed by grouping several detected patches. As a result, the sensitivity of the LBP/SVM-based system could not simply be changed to generate hit rate curves because increasing sensitivity might not lead to higher hit rates, as it may also affect the shape of the bounding box and lead to a smaller $A_0$. To generate graphs without Bayesian data fusion, the minimum number of patches for a bounding box was changed during crack patch grouping. Similarly, for graphs with Bayesian data fusion, the threshold of the posterior probability of being a crack was changed in Bayesian decision making.

From FIG. 27 and Table 4, it is shown that the first embodiment worked the best when "neighbor distance" was 16 and "minimum patches" were five during crack patch grouping. The preferred values of these two parameters are subject to change if the cracks sizes and the step size of scanning patches are different. The hit rates with Bayesian data fusion were approximately 20% higher than hit rates without fusion, which clearly shows that the proposed Bayesian data fusion significantly improves the accuracy and reliability of the crack detection framework.

TABLE 4

Hit rates of the proposed method with different parameters for crack patch grouping when false positive-per-frame was 1.

| | Without data fusion | | | with data fusion | | | |
|---|---|---|---|---|---|---|---|
| | Neighbor distance | | | min. # of connected patches | | | |
| | 8 | 16 | 24 | 5 | 10 | 15 | 20 |
| hit rate | 0.55 | 0.56 | 0.54 | 0.76 | 0.72 | 0.67 | 0.63 |

Figure 28:
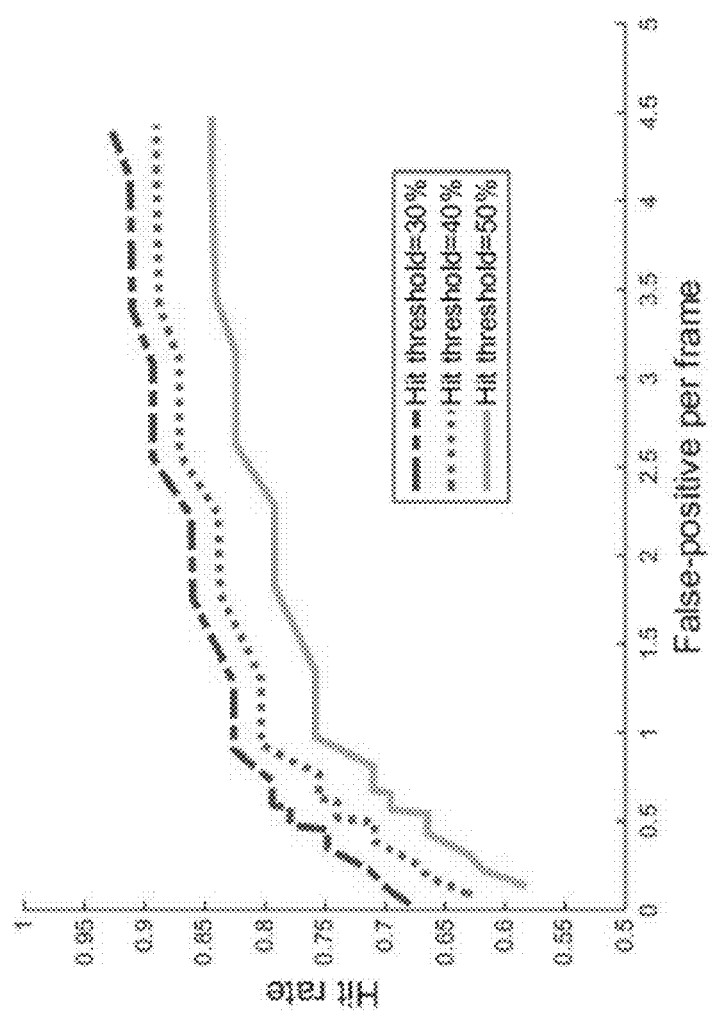
FIG. 28 is a plot representing performance evaluations of a LBP/SVM-based system using different hit thresholds.

With this setup, the LBP/SVM-based system achieved a hit rate of 0.76 with 1 false positive-per-frame. Note that the cracks had irregular sizes and shapes in the videos, because of which it was more challenging to predict their actual locations accurately in a frame compared to the general object detection problem. For inspection purposes, only the approximate locations of the cracks was needed. Thus, reducing the hit threshold of $A_0$ yields an increase in the hit rate of the system. FIG. 28 and Table 5 show hit rates with different hit thresholds for $A_0$. The hit rate was 0.83 with one false positive-per-frame when the hit threshold was 30%.

TABLE 5

Hit rates of the proposed method using different hit threshold of $A_0$ when false positive-per-frame was 1.

| | Hit threshold | | |
|---|---|---|---|
| | 50% | 40% | 30% |
| hit rate | 0.76 | 0.80 | 0.83 |

To train and validate the CNN, 5326 crack and non-crack images of 120×120 pixels from collected video frames were generated. In the videos, most of the cracks were horizontal (0 degree) or vertical (180 degree) with at most 15 degree slants. To detect cracks of different orientations and increase the variety of the database, the crack images were rotated by 22.5, 45, and 67.5 degrees then flipped and rotated by 90, 180, and 270 degrees. The pixel values of each image were also multiplied by a truncated Gaussian random variable, ranging from 0.85 to 1.20 with 0.08 standard deviation, to simulate brightness changes. For non-crack images, a program was used to randomly cropped them from the video frames. The final database contained a total 147,344 crack and 149,460 non-crack images.

Figure 29:
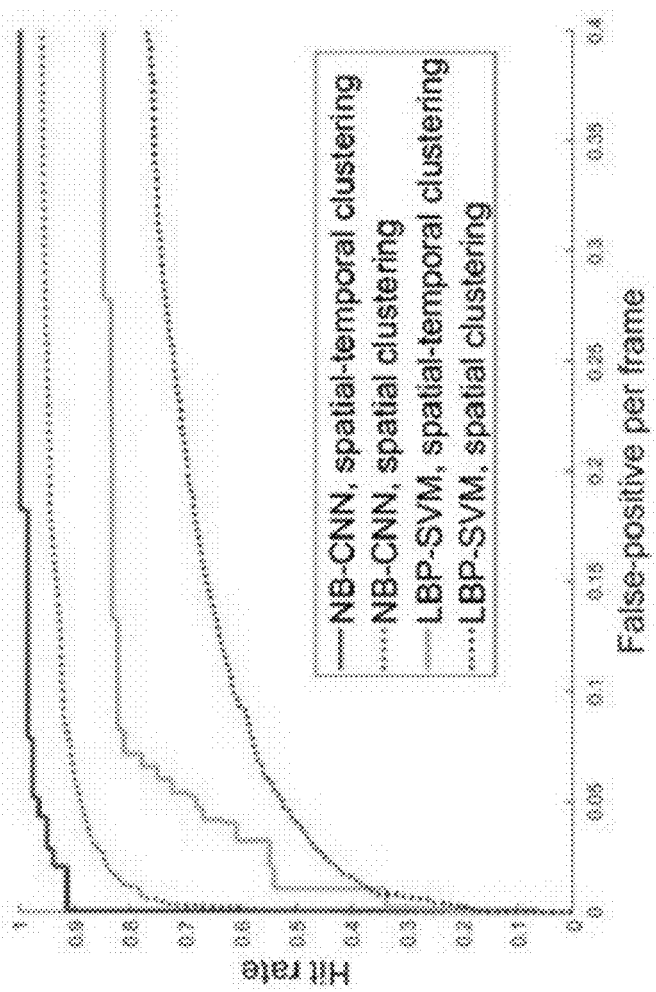
FIG. 29 is a plot representing hit rate versus false positive-per-frame (FPF) curves of a NB/CNN-based system and LBP/SVM-based system.

FIG. 29 illustrates the hit rate versus false positive per frame (FPF) curves of the NB/CNN-based system and the LBP/SVM-based system. The LBP/SVM-based system has its own likelihood functions and $H_{NB}(\cdot)$ as shown in images "c" and "d" of FIG. 21. The spatial clustering means each cluster is formed by spatially grouping the patches in a frame. The clustering is done frame by frame separately without considering the spatial-temporal coherence. FIG. 29 shows the NB/CNN-based system surpasses the LBP/SVM-based system and how much hit rates the spatial-temporal clustering improves for both NB/CNN-based system and LBP/SVM-based system. With 0.1 false-positive per frame, the NB/CNN-based system achieves 98.3% hit rate whereas the LBP/SVM-based system has only 82.1% hit rate. The spatial-temporal clustering reduces the miss rate (100%-hit rate) from 8.0% to 1.7% (79% less) for the NB/CNN-based system and from 38.7% to 17.9% (54% less) for the LBP/SVM-based system.

To show the effectiveness of the Naïve Bayes classification, four other methods for classifying tubelets was compared to the NB/CNN-based system. The first two methods intuitively use the number of crack patches ($s^c$>0.5) and the sum of the $s^c$ s in a tubelet. The third one is the method applied in the T-CNN which won the object-detection-from-video (VID) task in the ImageNet Large-Scale Visual Recognition Challenge 2015 (ILSVRC 2015). It takes the top-k score (i.e. $s_{kth}^c$: the kth largest $s^c$). The forth one sums up the likelihood gain using a simple Bayesian inference. To express them explicitly, a tubelet was considered a real crack if $$\begin{cases} \text{\# of cracks:} & \sum_{i=1}^{n} \{s_i^c > T\} \\ \text{sum of scores:} & \sum_{i=1}^{n} \{s_i^c - T\} \\ \text{top-}k\text{:} & s_{kth}^c > \theta_t \\ \text{simple Bayes:} & \sum_{i=1}^{n} H_{SB}(s_i^c) \\ \text{Naïve Bayes:} & \sum_{i=1}^{n} H_{NB}(s_i^c) \end{cases}$$

where n is the number of patches, $\{\cdot\}$ is the indicator function, T is the decision value equal to 0.5 for the CNN and 0 for the LBP-SVM, and $H_{SB}(\cdot)$ calculates the likelihood gain for the simple Bayesian inference. The "sum of scores" takes the minus of T such that the summation will always minus a value for a non-crack patch. $H_{SB}(\cdot)$ is defined as the following:

$$H_{SB}(s^c) = \begin{cases} \log P(s^c > T \mid C_{crk}) - \log P(s^c > T \mid C_{ncrk}), & \text{if } s^c > T \\ \log P(s^c \leq T \mid C_{crk}) - \log P(s^c \leq T \mid C_{ncrk}) & \text{if } s^c \leq T \end{cases}$$

where $S^c$ is the random variable of $s^c$. The $P(S^c \gtrless T | C)$s stand for the patch classification accuracies (e.g., TPR and FPR) that could be obtained during the validation. Both $\theta_t$ and k have optimal values for each method in the evaluation.

Figure 30:
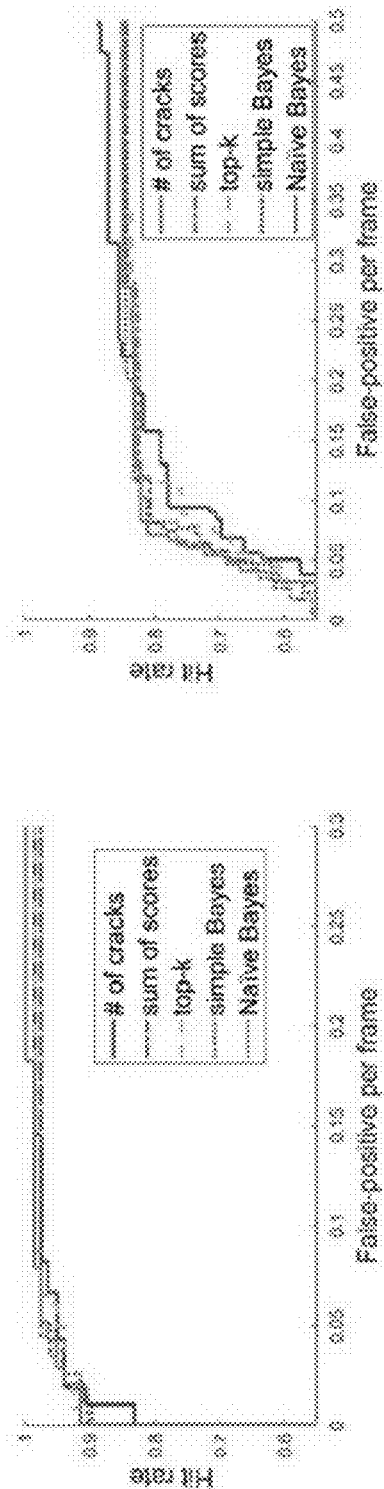
FIG. 30 includes plots representing hit rate versus false positive-per-frame (FPF) curves of different methods for classifying tubelets. Plot "a" includes data associated with a NB/CNN-based system and plot "b" includes data associated with a LBP/SVM-based system.

FIG. 30 demonstrates the hit rate versus FPF curves of all the methods aforementioned. It is hard to tell which method performs the best from the figure, thus Table 6 lists the average areas under the curves to compare them quantitatively. For both CNN and LBP-SVM, the Naïve Bayes attains the largest average areas. This shows the Naïve Bayes classification is the most effective method to classify tubelets. To process a 720×540 frame, "CNN Crack Patch Detection" takes about 2.55 seconds and other procedures takes 0.03 seconds. The computation time is a little bit longer than the LBP-SVM's (1.87 seconds), but the NB-CNN could provide much better detections.

TABLE 6

The average areas under the curves of different methods for classifying tubelets.

|  | # of cracks | sum of scores | top-k | simple Bayes | Naïve Bayes |
|---|---|---|---|---|---|
| LBP-SVM | 77.1% | 79.0% | 77.5% | 79.0% | 79.2% |
| CNN | 95.5% | 96.1% | 96.3% | 95.8% | 96.8% |

Figure 31:
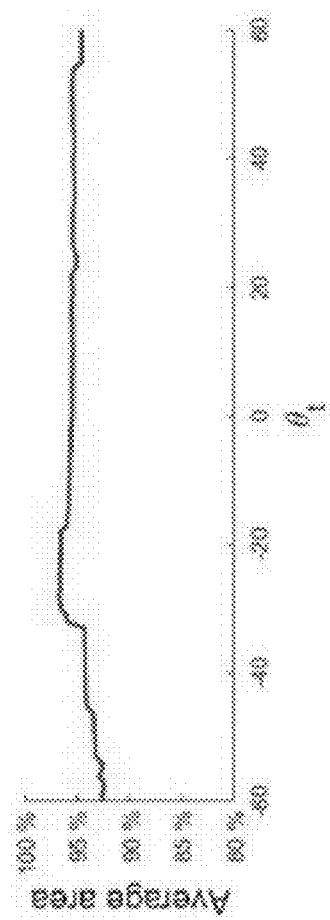
FIG. 31 is a plot representing average areas under curve versus different $\theta_t$ values.

To estimate the sensitivity toward $\theta_t$, FIG. 31 plots the average areas under curve versus different $\theta_t$ values. The plot has the maximum area when $\theta_t=-28$. The areas only has a standard deviation of 1%, which indicates the overall performance is not very sensitive toward $\theta_t$. To obtain the optimal value for $\theta_t$, this study takes average area under curve as the objective. Another reasonable objective could be the hit rate against a specific FPF (e.g., 0.1) based on the application. A more complex way is to collect a database of tubelets (not image patches) with crack or non-crack labels, acquire the statistic of the likelihood gains ($\Sigma H_{NB}(s_i^c)$), and find the optimal value for $\theta_t$ (e.g., by a 1D Bayesian classifier). It requires much more video data to have enough tubelets in the database. This way will attain the highest accuracy for classifying tubelets, but it does not guarantee to achieve the best objectives (e.g., hit rate or area under curve). In some situations where none of the above methods is applicable, mathematically $\theta_t=-\log P(C_{crk})+\log P(C_{ncrk})$ by setting $\theta=1$. The priors $P(C_{crk})$ and $P(C_{ncrk})$ could be empirically assigned or the equal priors $P(C_{crk})=P(C_{ncrk})$ could be assumed which leads to $\theta_t=0$. FPF is greater than 0.2. As $\theta_c$ controls the overall detection sensitivity, its value should be set according to the application's FPF allowance or targeting hit rate based on Table 7 or the curve in FIG. 29. This investigation achieved a 98.3% hit rate against 0.1 FPF when $\theta_t=-28$ and $\theta_c=8.7$.

TABLE 7

The list of hit rates and FPFs of different $\theta_c$ values when $\theta_t = -28$.

| hit rate | | | | |
|---|---|---|---|---|
| 91.3% | 96.4% | 98.3% | 99.7% | 99.7% |
| FPF 0.01 | 0.05 | 0.1 | 0.2 | 0.3 |
| $\theta_c$ 1153.2 | 191.7 | 8.7 | −18.6 | −27.1 |

Figure 32:
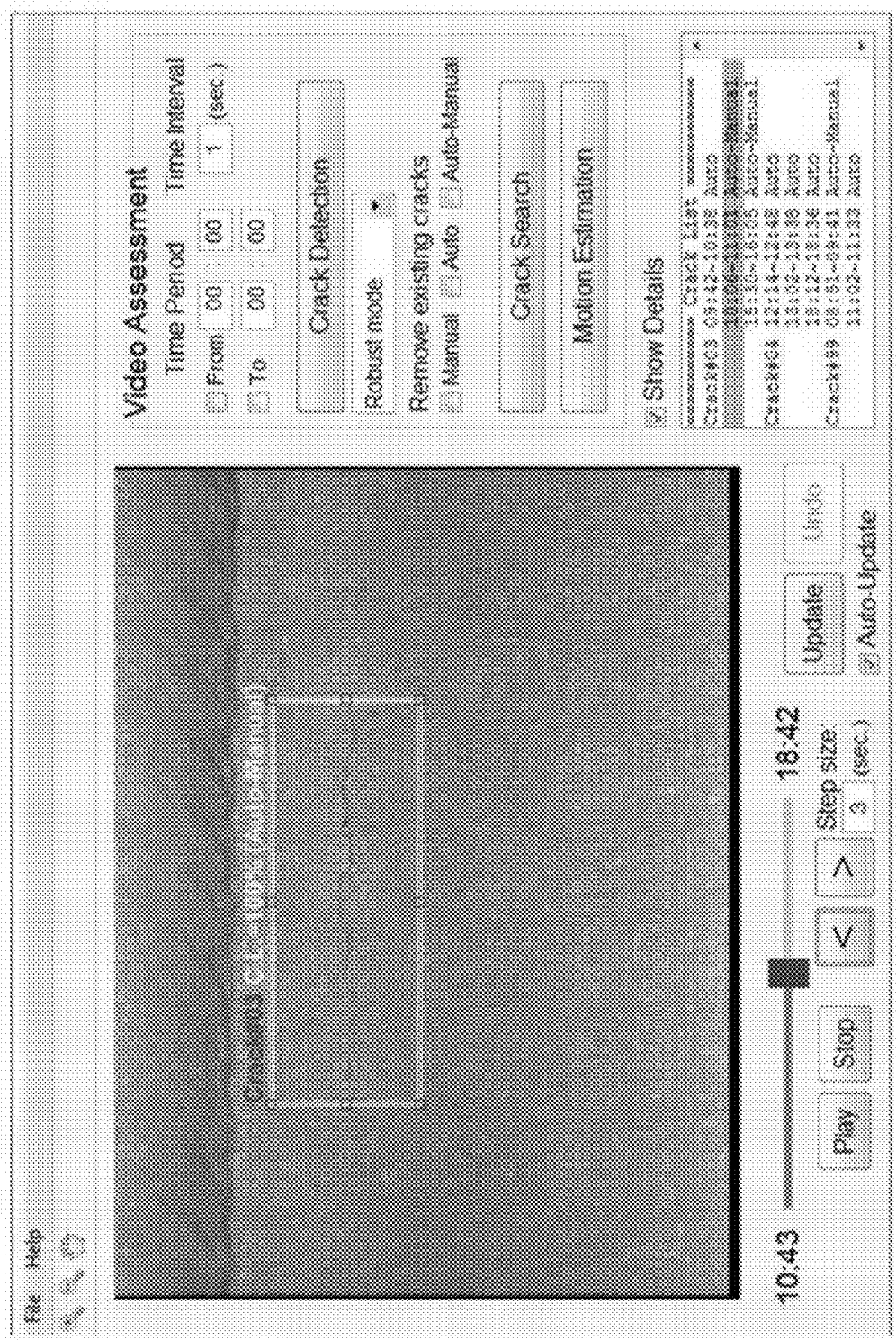
FIGS. 32-39 represent various features of a nonlimiting graphical user interface (GUI) suitable for use in a crack detection method in accordance with a nonlimiting aspect of the invention.
Figure 33:
Figure 34:
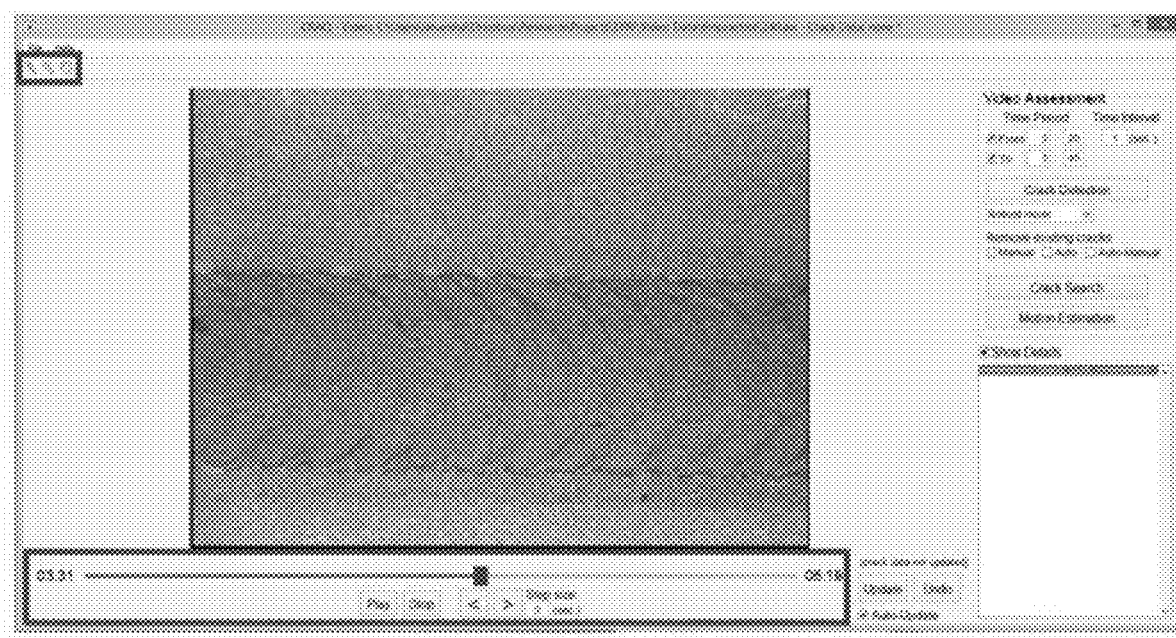
Figure 35:
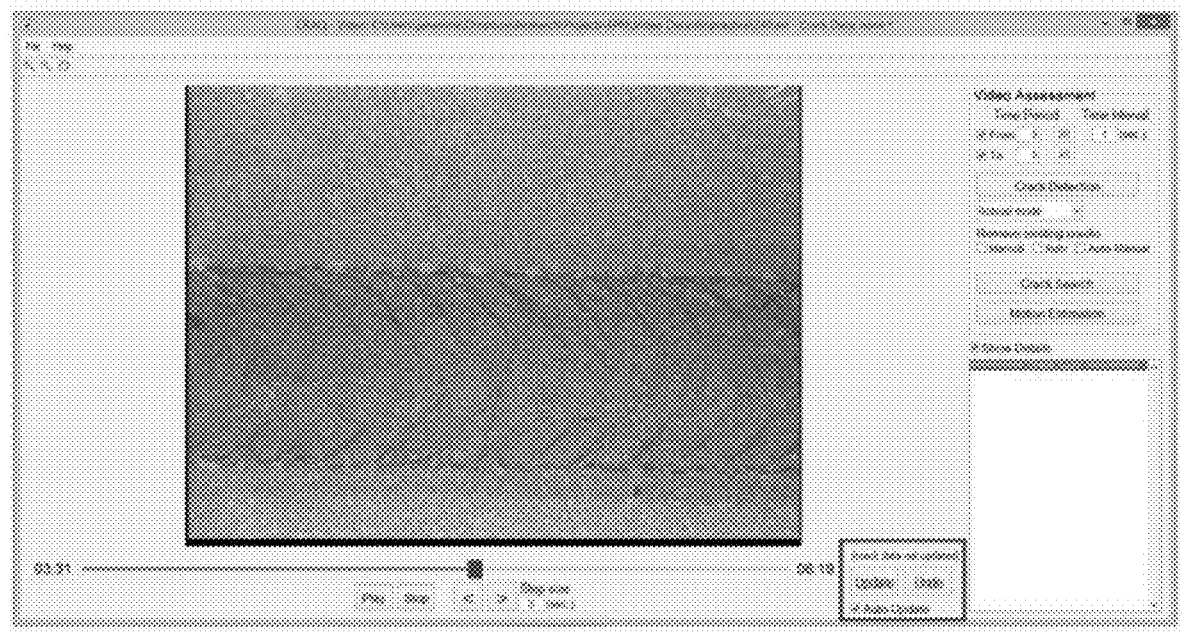
Figure 36:
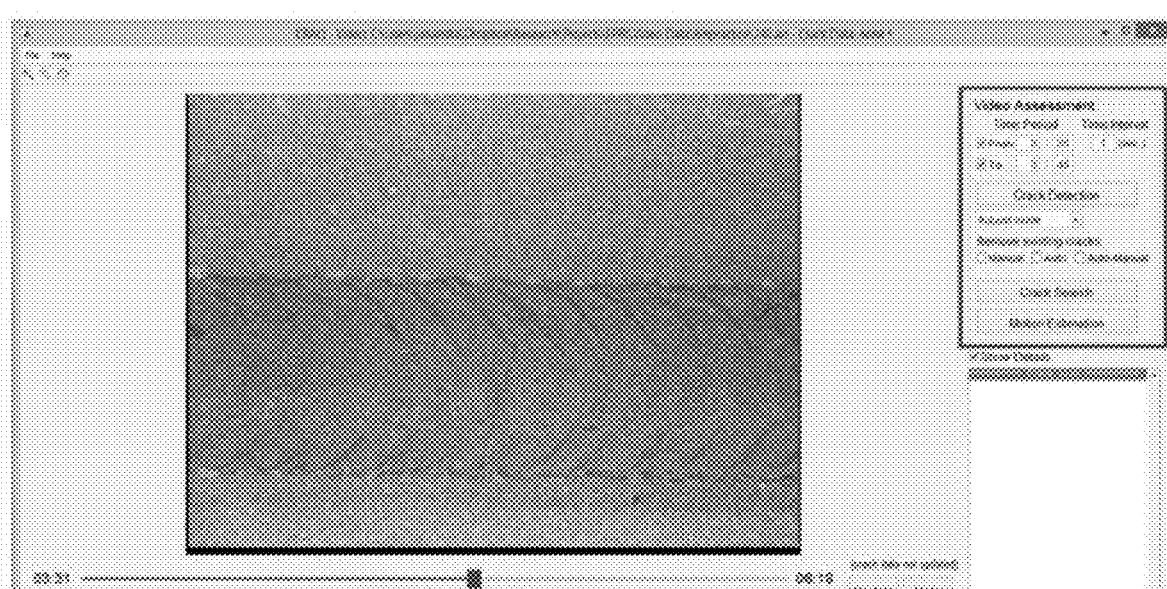
Figure 37:
Figure 38:
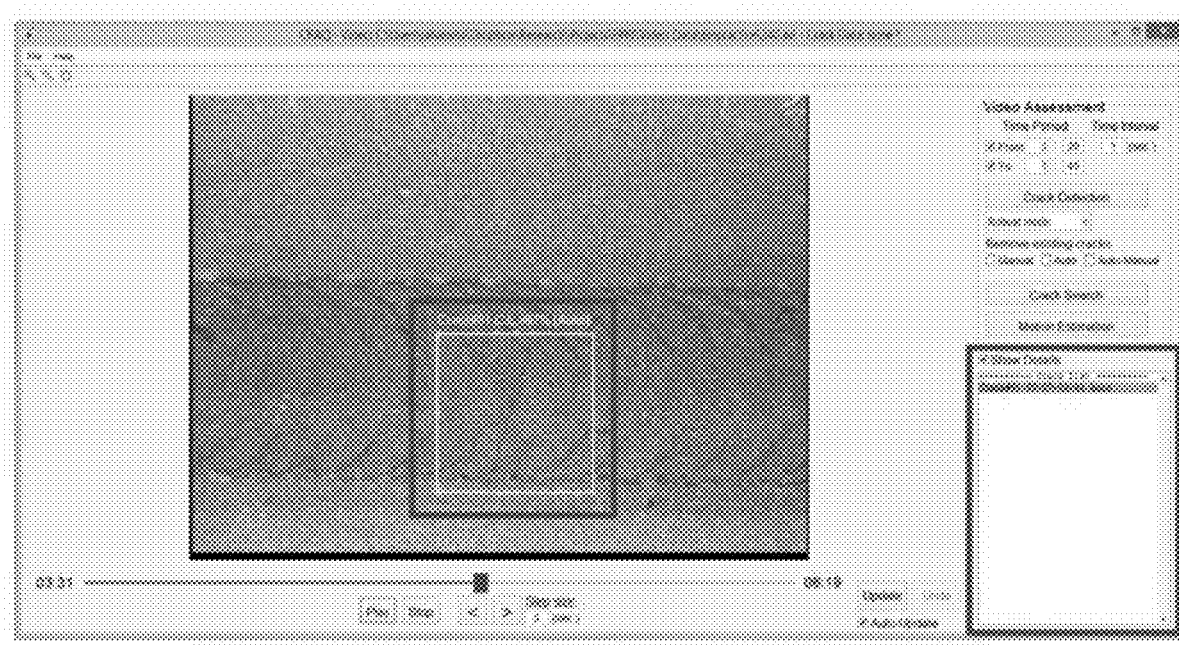

FIGS. 32-39 are images containing screenshots of a nonlimiting graphical user interface (GUI) that provides a user with the ability to open inspection videos and specify the time interval between analyzed video frames so that the system processes the desired video frames and reports the existence of cracks with a probabilistic confidence measure. FIG. 32 is a screenshot of the GUI and shows a video frame in a display window of the GUI, FIG. 33 is a screenshot showing a file menu of the GUI, FIG. 34 is a screenshot highlighting zoom and pan icons at the left-top of the window and video controls at the bottom of the window, FIG. 35 is a screenshot highlighting update and undo buttons of the GUI, FIG. 36 is a screenshot highlighting a video assessment section of the GUI, FIG. 37 is a screenshot showing a progress bar that appears after starting an operation (closing the bar will abort the operation), FIG. 38 is a screenshot highlighting a crack box and a log window that displays a list of detected/added cracks, and FIG. 39 contains three screenshots showing the same crack detected in different time periods. With the represented embodiment, a user can open a video, load or save crack data, export crack data in YAML or EXCEL formats, zoom-in, zoom-out, and pan the current video. A timeline bar and the buttons therebelow allow the user to navigate through the video (FIG. 34). The user can drag or select a video frame to add, select, or modify bounding boxes of cracks. Preferably, the user can add, delete, and modify crack annotations. By checking the "Auto-Update" box, the GUI updates the changes before any other operations (FIG. 35).

The video assessment section is on the top-right side of the GUI in FIG. 36. The user can set a "Time period" of operations by specifying the "From" and "To" time periods. Unchecked "From" means from the beginning and unchecked "To" means to the end of the video. "Time interval" sets the time interval to scan the frames within the video to detect crack boxes. A "Crack Detection" button runs the proposed crack detection method where the user can select "Robust" or "Sensitive" mode. The latter is more appropriate for relatively small cracks but may lead to more false positives. Checking one of the boxes below "Remove existing cracks" removes the cracks on the log window whenever the "Crack Detection" button is pressed. "Manual" and "Auto" boxes correspond to user-defined and automatically detected crack boxes, respectively. "Auto-Manual" relates to the automatically detected cracks that are modified by the user manually. "Motion Estimation" estimates the movements between frames. "Crack Search" tries to find the same crack that appears in different time periods based on the motion between frames.

When the GUI starts an operation, progress bars appear to indicate current progress of the operation (FIG. 37). After the data are processed, the detected/added crack bounding boxes are generated for the same cracks throughout the video shown in the frame. Checking "Show Details" shows the confidence level of the bounding box and whether it is "Auto", "Manual" or "Auto-Manual". The color of a bounding box can also be used to indicate confidence level. For example, a higher confidence level can be indicated by a bounding box having a more reddish color. In the log window, "Crack List" shows all the bounding boxes in the video and the user can select the items of the list and conveniently jump to video frames that contain cracks (FIG. 38). Output information includes the time interval(s) that a crack is visible in a video, location of the crack in each frame, and its corresponding confidence level. The user can delete any of the items in the list by highlighting the list and pressing "Delete" key. The GUI can read the output files and conveniently visualize the annotated cracks from previous processes.

Figure 39:
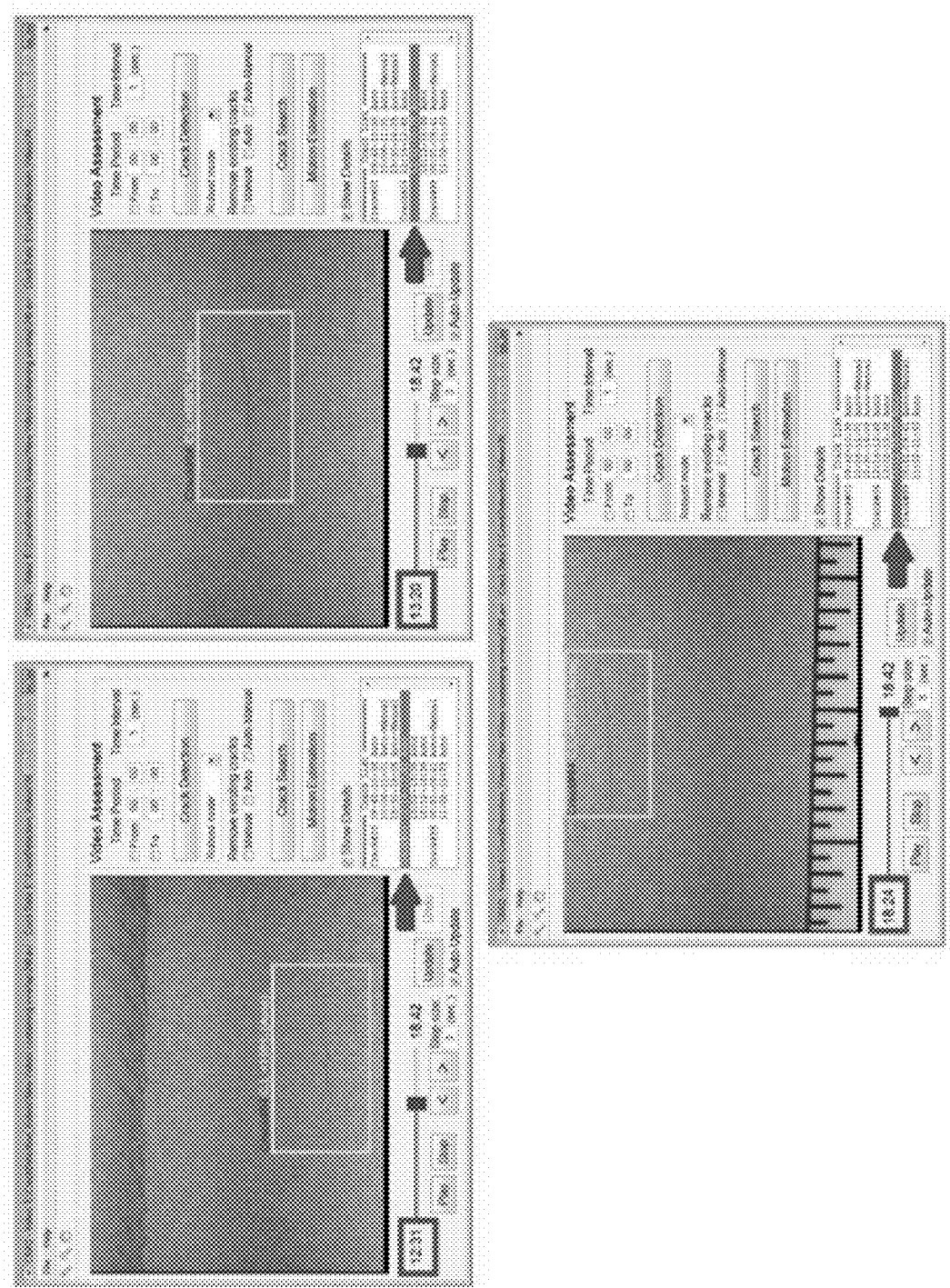

FIG. 39 contains examples of three screenshots showing a single crack detected in different time periods: at 12:31, 13:20, and 18:24 in the video. In the list, the same crack will have the same ID (#4 in the example). The "Crack Search" operation may help with finding the same crack that appears at different times in the video.

It is foreseeable that the methods and systems may further provide additional information about detected cracks, such as but not limited to crack length and width measurements, thereby providing a user with information regarding the severity of the crack.

Regularly inspecting nuclear power plant components is important, but current practice is time-consuming and subjective. As existing automatic crack detection methods commonly fail to detect the cracks on metallic surfaces visible in videos, the methods and systems reported herein provided beneficial means for autonomously detecting cracks. A particularly beneficial feature of these methods and systems includes the capability of analyzing video. Many existing methods for crack detection focus on detecting cracks from a single image. If a crack is miss-detected or a noisy pattern is falsely detected in the image, no other information could help to correct the detection results. Also, if a stitched image from video frames is used, the stitching process might blur or even completely remove the high frequency components (e.g., edges) by blending the overlapping frames. This would make detecting tiny cracks much harder. The systems and methods disclosed herein address these issues by analyzing video and tracking cracks in subsequent frames to provide more accurate results.

While the invention has been described in terms of specific or particular embodiments and investigations, it should be apparent that alternatives could be adopted by one skilled in the art. For example, various components could be used for the system and processing parameters such as patch size could be modified. In addition, the invention encompasses additional or alternative embodiments in which one or more features or aspects of the disclosed embodiment could be eliminated, or different disclosed embodiments may be combined. Accordingly, it should be understood that the invention is not necessarily limited to any embodiment described herein or illustrated in the drawings. It should also be understood that the phraseology and terminology employed above are for the purpose of describing the disclosed embodiments and investigations, and do not necessarily serve as limitations to the scope of the invention. Therefore, the scope of the invention is to be limited only by the following claims.

The invention claimed is:

1. A system for detecting cracks in a surface, the system comprising:
   a video camera that senses RGB channels to generate overlapping successive frames of color images;
   a light source;
   means for simultaneously scanning the video camera and the light source past the surface while filming with the camera to produce a video of the surface so that the video contains individual frames of the overlapping successive frames of color images so that surface texture features that appear in a first individual frame of a consecutive frame pair of the overlapping successive frames also appear in at least a second individual frame of the consecutive frame pair;
   a visual descriptor configured to analyze the individual frames of the overlapping successive frames of the video to obtain surface texture feature data for areas of the surface depicted in each of the first and second individual frames of the consecutive frame pair;
   a trained machine learning classifier configured to analyze the surface texture feature data to detect the surface texture features in the areas of the surface depicted in each of the first and second individual frames of the consecutive frame pair;
   means for tracking the motion of the detected surface texture features in the first and second individual frames of the consecutive frame pair to produce tracking data; and
   means for using the tracking data to filter non-crack surface texture features from the detected surface texture features in the first and second individual frames of the consecutive frame pair.

2. The system of claim 1, wherein the visual descriptor is local binary patterns.

3. The system of claim 2, wherein the trained machine learning classifier is a support vector machine (SVM).

4. The system of claim 1, wherein the machine learning classifier comprising a multi-stage algorithm wherein the surface texture feature data is first analyzed with a linear kernel and then the results are analyzed with a radial basis function kernel.

5. The system of claim 1, wherein the means for filtering non-crack surface texture features includes application of the Bayesian decision theory.

6. The system of claim 1, wherein the visual descriptor is a layer comprised in a convolutional neural network (CNN) architecture.

7. The system of claim 1, wherein the means for filtering non-crack surface texture features includes application of a clustering procedure that accords with the spatial-temporal coherence of the surface texture features in the video and a Naïve Bayes classifier configured to discard false-positives.

8. The system of claim 1, wherein the non-crack surface texture features include surface scratches, welds, and grind marks on the surface.

9. A system for detecting cracks in a surface, the system comprising:
   a video camera that senses RGB channels to generate overlapping successive frames of color images;
   a light source;
   means for simultaneously scanning the video camera and the light source past the surface while filming with the camera to produce a video of the surface so that the video contains a series of individual frames of the overlapping successive frames of the color images so that surface texture features that appear in a first individual frame of a consecutive frame pair of the overlapping successive frames also appear in at least a second individual frame of the consecutive frame pair;
   a convolutional neural network (CNN) architecture configured to analyze the individual frames of the overlapping successive frames of the video to obtain surface texture feature data for areas of the surface depicted in each of the individual frames and analyze the surface texture feature data to detect surface texture features in the areas of the surface depicted in each of the first and second individual frames of the consecutive frame pair;
   means for tracking the motion of the detected surface texture features in the first and second individual frames of the consecutive frame pair to produce tracking data; and
   means for using the tracking data to filter non-crack surface texture features from the detected surface texture features in the first and second individual frames of the consecutive frame pair.

10. The system of claim 9, further comprising means for performing a clustering procedure that accords with the spatial-temporal coherence of the surface texture features in the video.

11. The system of claim 9, further comprising a Naïve Bayes classifier configured to discard false-positives.

12. A method for detecting cracks in a surface, the method comprising:
   simultaneously scanning a video camera and a light source past the surface while filming with the camera to produce a video of the surface so that the video contains a series of individual frames of overlapping successive frames of color images of RGB channels so that surface texture features that appear in a first individual frame of a consecutive frame pair of the overlapping successive frames also appear in at least a second individual frame of the consecutive frame pair;

analyzing the individual frames of the overlapping successive frames of the video to obtain surface texture feature data for areas of the surface depicted in each of the first and second individual frames of the consecutive frame pair;

analyzing the surface texture feature data to detect the surface texture features in the areas of the surface depicted in each of the first and second individual frames of the consecutive frame pair;

tracking the motion of the detected surface texture features in the first and second individual frames of the consecutive frame pair to produce tracking data; and using the tracking data to filter non-crack surface texture features from the detected surface texture features in the first and second individual frames of the consecutive frame pair.

13. The method of claim 12, wherein analyzing the individual frames of the video includes using a local binary patterns visual descriptor.

14. The method of claim 13, wherein analyzing the surface texture feature data includes using a support vector machine (SVM).

15. The method of claim 12, wherein analyzing the surface texture feature data includes using trained machine learning classifier that comprises a multi-stage algorithm wherein the surface texture feature data is first analyzed with a linear kernel and then the results are analyzed with a radial basis function kernel.

16. The method of claim 12, wherein using the tracking data to filter non-crack surface texture features includes application of the Bayesian decision theory.

17. The method of claim 12, wherein after using the tracking data to filter non-crack surface texture features from the detected surface texture features in the first and second individual frames of the consecutive frame pair, the remaining detected surface texture features represent cracks in the surface.

18. The method of claim 12, further comprising using a convolutional neural network (CNN) architecture to analyze the individual frames of the video to obtain the surface texture feature data and analyze the surface texture feature data to detect the surface texture features.

19. The method of claim 18, further comprising performing a clustering procedure that accords with the spatial-temporal coherence of the surface texture features in the video.

20. The method of claim 19, further comprising using a Naïve Bayes classifier to discard false-positives.

* * * * *